United States Patent Office 3,551,440
Patented Dec. 29, 1970

3,551,440
3-PHENYL - 5(ALKYL)ISOTHIAZOLE - 4 - CARBOXYLIC ACIDS AND INTERMEDIATES THEREOF
Takayuki Naito and Susumu Nakagawa, Tokyo, Japan, assignors, by mesne assignments, to Bristol-Myers Company, a corporation of Delaware
No Drawing. Original application July 25, 1966, Ser. No. 567,375, now Patent No. 3,341,518. Divided and this application Dec. 12, 1966, Ser. No. 600,780
Int. Cl. C07d 91/12
U.S. Cl. 260—302                14 Claims

ABSTRACT OF THE DISCLOSURE 3-(substituted-phenyl)-5-alkyl-4-isothazole-nitriles, carboxylic acid amides and carboxylic acids are useful as intermediates for reaction with 6-aminopenicillanic acid to make penicillins. In one of several processes, 4-cyano-3-phenylisothiazole is reacted with n-butyl lithium and then methyl iodide to produce 4-cyano-5-methyl-3-phenylisothiazole which is hydrolyzed to the amide with sulfuric acid and thence to 5-methyl-3-phenyl-isothiazole-4-carboxylic acid by nitrous acid. Treatment with thionyl chloride then provides the acid chloride which is reacted with 6-aminopenicillanic acid to produce the corresponding penicillin having potent antibacterial properties.

CROSS-REFERENCES TO RELATED APPLICATIONS

This application is a division of our co-pending application Ser. No. 567,375 filed July 25, 1966, now U.S. Pat. No. 3,341,518, which was in turn a continuation-in-part of our prior, co-pending applications, Ser. No. 466,414 filed June 23, 1965, and Ser. No. 518,801 filed Jan. 5, 1966, said prior applications subsequently having been abandoned.

BACKGROUND OF THE INVENTION

(1) Field of the invention

This invention relates to chemical compounds useful, for example in the preparation of anti-bacterial agents and, more particularly to 3-(substituted phenyl)-5-alkyl-4-isothiazole-nitriles, carboxylic acid amides and carboxylic acids which are useful, for example, in the acylation of 6-aminophenicillanic acid to produce potent penicillins.

(2) Description of the prior art

There exists a need to provide alternative and improved agents for the treatment of infections caused by resistant strains of bacteria, e.g. benzylpenicillin-resistant strains of *Staphylococcus aureus* (*Micrococcus pyogenes* var. *aureus*), or for the decontamination of objects bearing such organisms, e.g. hospital equipment, walls of operating rooms and the like.

SUMMARY OF THE INVENTION

The 5-alkyl-3-arylisothiazoles of the present invention are compounds having the formula

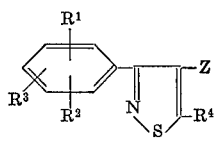

wherein Z represents

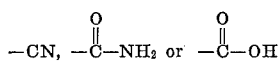

—CN, —C(=O)—NH$_2$ or —C(=O)—OH $R^1$, $R^2$ and $R^3$ represent hydrogen, chloro, bromo, iodo, trifluoromethyl, fluoro, methylsulfonyl, nitro, (lower) alkyl or (lower)alkoxy, and $R^4$ represents (lower)alkyl.

The preferred embodiments of the present invention are the compounds of the formula set out above in which $R^1$ is hydrogen, $R^2$ and $R^3$ are hydrogen, fluoro or chloro and $R^4$ is methyl.

The isothiazoles above are prepared in the manner exemplified in the examples below and especially from known anilines according to the following reaction scheme in which Ar represents the radical

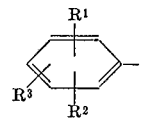

in which $R^1$, $R^2$ and $R^3$ have the meaning set forth above, $R^4$ represents a (lower)alkyl group and $X_2$ represents iodine or bromine:

$$Ar-NH_2 \xrightarrow{NaNO_2,\ CuCN} Ar-CN \xrightarrow{Na,\ CH_3CN} \text{(1)}$$

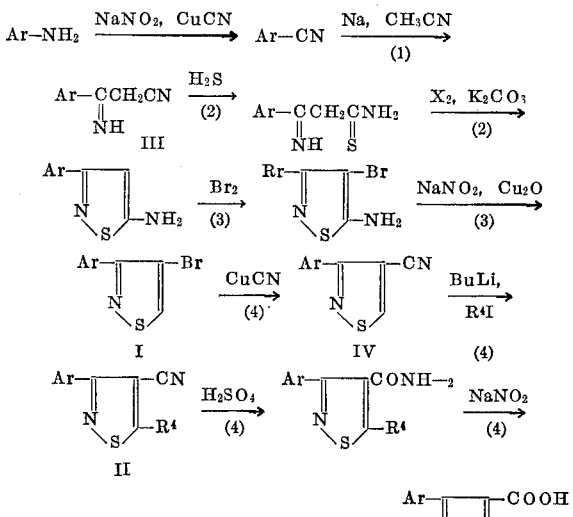

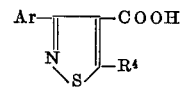

(1) Beilstein, 10, 681; EI 10, 322; EII 10, 469.
(2) J. Goerdeler and H. W. Pohland, Ber. 94, 2950 (1961); cf. A. Adams and Slack, J. Chem. Soc. 1959, 3061.
(3) cf. D. Buttimore et al., J. Chem. Soc. 1963, 2032.
(4) cf. M. P. L. Caton et al., J. Chem. Soc., 1964; 446.

In another useful procedure compound III above is converted to compound IV above in the following manner:

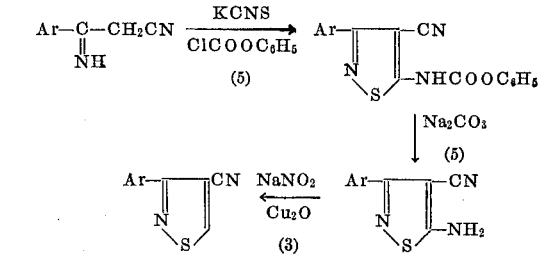

(3) cf. Buttimore et al., J. Chem. Soc. 1963, 2032.
(5) cf. J. Goerdeler and U. Keuser, Ber. 97, 3106 (1964).

In an alternative method, compound I above is first treated with BuLi and $R^4I$ to produce

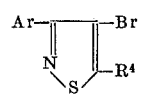

which is then reacted with CuCN to give compound II above.

In a variation of this procedure the starting benzonitrile, as illustrated by 2,6-dichlorobenzonitrile, is prepared in the following manner:

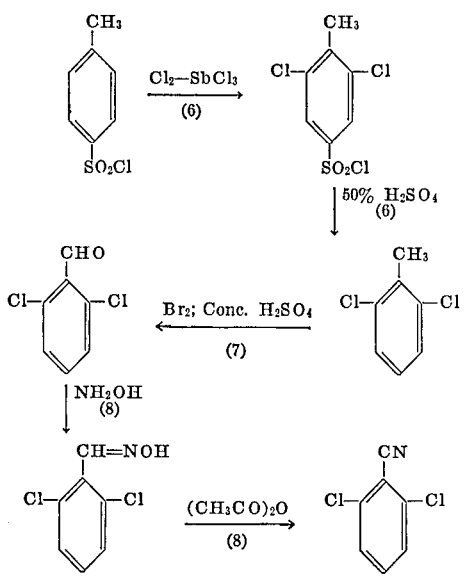

(6) W. Davies, J. Chem. Soc. 119, 853 (1921).
(7) cf. G. Look and E. Bock, Ber. 70, 916 (1937).
(8) M. S. Reich, Bull. Soc. Chim., France, [4]21, 217 (1917).

Use may be also made of the following procedure to prepare the desired 5-alkyl-3-aryl-isothiazole-4-carboxylic acids:

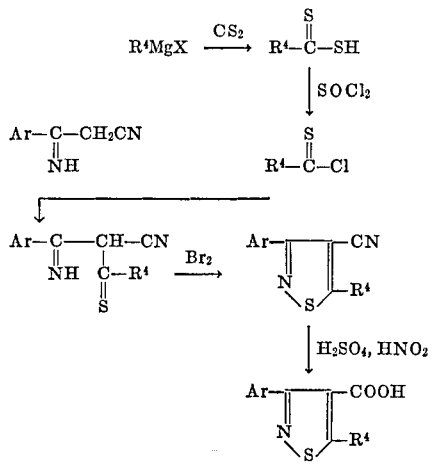

Alternate routes to the desired 5-alkyl-3-arylisothiazole-4-carboxylic acids are those set forth below as illustrated by the preparation of 5-methyl-3-phenylisothiazole-4-carboxylic acid, as follows:

I.

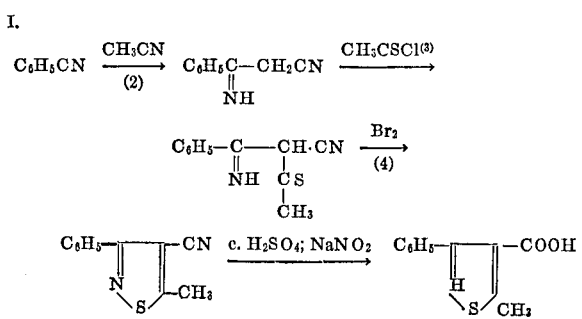

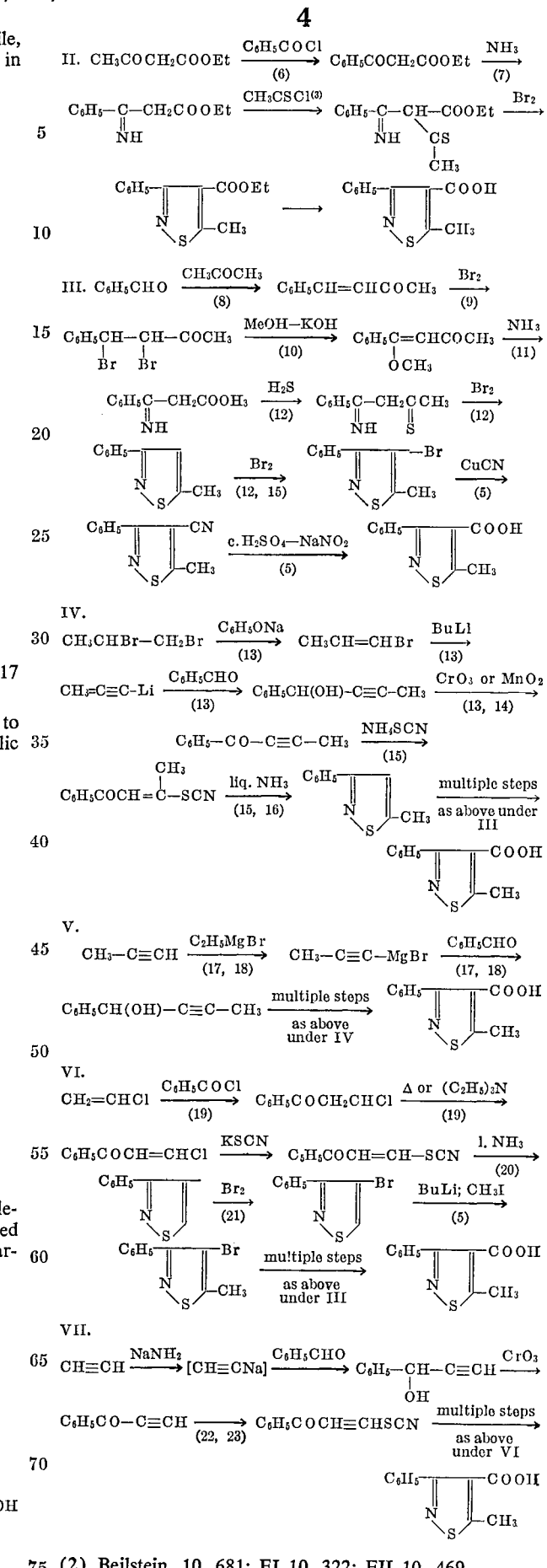

(2) Beilstein, 10, 681; EI 10, 322; EII 10, 469.

(3) cf. H. Staudinger and J. Siegwart, Helv., 3, 824 (1920).
(4) cf. J. Goerdeler and H. W. Pohland, Ber., 94, 2950 (1961).
(5) cf. M. P. L. Caton et al., J. Chem. Soc., 1964, 446.
(6) J. M. Straley and A. C. Adams, Org. Syn. Coll. vol. 4, 415 (1963).
(7) cf. S. A. Glickman et al., J. Am. Chem. Soc., 67, 1017 (1945).
(8) N. L. Drake and P. Allen, Jr., Org. Syn. Coll., vol. 1, 77 (1941).
(9) L. Claisen and A. Claparede, Ber., 14, 2460 (1881).
(10) C. Weygand, Ber., 58, 1473 (1925).
(11) L. Claisen, Ber., 59, 144 (1926).
(12) J. Goerdeler and W. Mettler, Ber., 96, 944 (1963).
(13) D. Y. Curtin and J. W. Crump, J. Amer. Chem. Soc. 80, 1922 (1958).
(14) K. R. Bharucha, J. Chem. Soc. 1956, 2446.
(15) cf. M. S. Grant et al., J. Chem. Soc. 1965, 3842.
(16) R. Slack and K. R. H. Wooldridge, Advances in Heterocyclic Chemistry, vol. 4, p. 107 (1965, (Academic Press).
(17) cf. L. Skattele et al., Org. Syn. Coll., vol. 4, 792 (1963).
(18) E. A. Braund and J. A. Coles, J. Chem. Soc. 1951, 2078.
(19) V. T. Kleinko et al., J. Gen. Chem. USSR 27, 415 (1957).
(20) cf. F. Willie et al., Angew. Chem. 74, 467 and 753 (1962).
(21) cf. D. Buttimore et al., J. Chem. Soc. 1963, 2032.
(22) W. R. Benson and A. E. Pohland, J. Org. Chem. 29, 385 (1964).
(23) N. K. Kochetkov, Doklady Akad. Navk. USSR, 82, 593 (1952); C. A. 47, 2691 (1953).

Within the scope of the present invention are the compounds having the formula

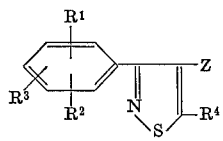

wherein Z represents

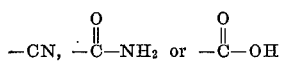

$R^1$, $R^2$ and $R^3$ each represent hydrogen, chloro, bromo, iodo, trifluoromethyl, fluoro, methylsulfonyl, nitro (lower)alkyl or (lower)alkoxy, and $R^4$ represents (lower)alkyl, and, as preferred embodiments, the compounds of the formula

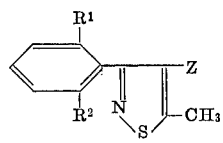

wherein Z represents

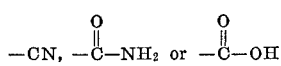

and $R^1$ and $R^2$ each represent hydrogen, chloro or fluoro.

The availability of the compounds of the present invention has made possible the synthesis of a series of substituted isothiazole derivatives of 6-aminopenicillanic acid. These penicillins have value as antibacterial agents, as nutritional supplements in animal feeds, as agents for the treatment of mastitis in cattle, as therapeutic agents in poultry and animals, including man, in the treatment of infectious diseases caused by Gram-positive bacteria, especially *Staphylococcus aureus* and other penicillinase producing bacteria, and sometimes those infections caused by Gram-negative bacteria.

The need for alternative and improved agents for the treatment of infections caused by resistant strains of bacteria, e.g. benzylpenicillin-resistant strains of *Staphylococcus aureus* (*Micrococcus pyogenes* var. *aureus*), or for the decontamination of objects bearing such organisms, e.g. hospital equipment, walls of operating rooms and the like, has been met by the synthesis of compounds having the formula

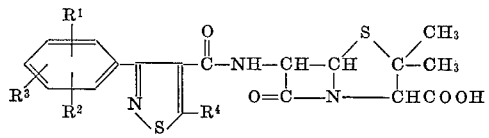

wherein $R^1$, $R^2$ and $R^3$ each represents hydrogen, chloro, bromo, iodo, trifluoromethyl, fluoro, methylsulfonyl, nitro, (lower)alkyl or (lower)alkoxy and $R^4$ represents (lower)alkyl; and the nontoxic, pharmaceutically acceptable salts thereof.

The process of preparing penicillins of the formula

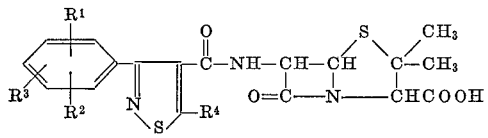

wherein each of $R^1$, $R^2$, $R^3$ and $R^4$ has the meaning set forth above and nontoxic salts thereof, comprises chemically coupling with 6-aminopenicillanic acid or a salt thereof either (a) an acid chloride of the formula

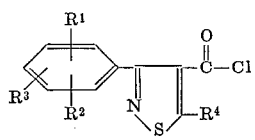

wherein $R^1$, $R^2$, $R^3$ and $R^4$ have the meaning set forth above, or (b) the functional equivalent of said acid chloride as an acylating agent for a primary amino group. Such equivalents include the corresponding carboxylic acid bromides, acid anhydrides, including mixed anhydrides and particularly the mixed anhydrides prepared from stronger acids such as the lower aliphatic monoesters of carbonic acid of alkyl and aryl sulfonic acids and of more hindered acids such as diphenylacetic acid. In addition, an acid azide or an active ester or thioester (e.g. with p-nitrophenol, 2,4-dinitrophenol, thiophenol, thioacetic acid) may be used or the free acid itself may be coupled with 6-aminopenicillanic acid after first reacting said free acid with N,N' - dimethylchloroformiminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2,684], of a carbodiimide reagent [especially N,N'-dicyclohexylcarbodiimide, N,N'-diisopropylcarbodiimide or N-cyclohexyl-N' - (2 - morpholinoethyl)carbodiimide; cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. The methods for carrying out these reactions to produce a penicillin and the methods used to isolate the penicillins so-produced are well known in the art.

DESCRIPTION OF THE PREFERRED EMBODIMENTS

The following examples will serve to illustrate this invention without limiting it thereto. All melting points are uncorrected and all temperatures are given in degrees Centigrade.

EXAMPLE 1

Benzonitrile.—The preparation of benzonitrile followed the procedure of Sandmeyer [Ber. 17, 2653 (1884)]. A mixture of 70 g. (1.0 mole) of aniline, 220 ml. of concentrated hydrochloric acid and 800 ml. of water was diazotized with 70 g. (1.0 mole) of sodium nitrile in 200 ml. of water at 0–5° C. in the usual manner. To a stirred mixture of 250 g. of copper sulfate, 280 g. potassium cyanide and 1.5 l. water was added the diazotized solution at 90° C. and stirring was continued for another three hours. The reaction mixture was distilled until about one-third of the contents of the flask remained. The distillate was extracted with three 200 ml. portions of ether. The ether extracts were dried over anhydrous sodium sulfate. The ether was removed by distillation and the residual oil was distilled; B.P. 185–192° C. (lit. 190° C.); yield 80 g. (78%) of benzonitrile.

β-Imino-β-phenylpropionitrile.—The preparation of β-imino-β-phenylpropionitrile was carried out according to the procedure of Holzwart (J. Prakt. Chem., [2] 39, 242). To a stirred dispersion of 72.5 g. (3.16 atoms) of metallic sodium in 500 ml. of toluene and 600 ml. of benzene was added dropwise a mixture of 163 g. (1.58 moles) of benzonitrile and 129 g. (3.16 moles) of acetonitrile at such a rate that gentle refluxing was maintained. After the addition was completed, stirring and refluxing by external heating were continued for seven hours. After cooling, the precipitated sodium salt was collected by filtration. The salt was treated with water to give the free base. Yield 130 g. (57%) of β-imino-β-phenylpropionitrile. An analytical sample was recrystallized from petroleum ether, M.P. 86–87° C. (lit. 86° C.)

$\lambda_{max.}^{EtOH}$ 230 m$\mu$ ($\epsilon$ 11,350), 294 m$\mu$ ($\epsilon$ 11,220). $\nu_{max.}^{KBr.}$ 3490, 3390, 2210, 1640, 1593, 1575, 1500, 1450, 1410, 785, 710 cm.$^{-1}$ Analysis.—Calcd. for $C_9H_8N_2$ (percent): C, 74.97; H, 4.59; N, 19.42. Found (percent): C, 74.97, 75.28; H, 5.36, 5.32; N, 19.15, 19.51.

β-Imino-β-phenylthiopropionamide—β-Imino-β-phenylthiopropionamide was prepared according to the procedure of J. Goerdeler and H. W. Pohland [Ber. 94, 2950 (1961)]. Liquid hydrogen sulfide (6 ml.) and 0.05 g. of potassium hydroxide were placed in a 100 ml. ampoule cooled with Dry Ice-acetone mixture at −60° C. and a solution of 5.8 g. (0.04 mole) β-imino-β-phenylpropionitrile in 35 ml. of methylene chloride was added. The ampoule was sealed and allowed to stand at room temperature for a week. The precipitate of β-imino-β-phenylthiopropionamide which separated was collected by filtration and washed with ether. Yield 4.0 g. (57%). The analytical sample was recrystallized from benzene. M.P. 169–171° C. (lit. 174° C.).

$\lambda_{max.}^{EtOH}$ 237 m$\mu$ ($\epsilon$ 9,700), 295 m$\mu$ ($\epsilon$ 8,300), 354 m$\mu$ ($\epsilon$ 19,400). $\nu_{max.}^{Nujol}$ 3480, 3400, 3320, 1610, 1550, 1500, 1475 1390, 1280 (broad), 1130 (broad), 940, 775 cm.$^{-1}$, Analysis.—Calcd. for $C_9H_{10}N_2S$ (percent): C, 60.66; H, 5.66; N, 15.72. Found (percent): C, 60.77, 60.93; H, 5.36, 5.50; N, 15.19, 15.10.

5-amino - 3 - phenylisothiazole.—5-amino-3-phenylisothiazole was prepared according to the procedure of J. Goerdeler and H. W. Pohland [Ber. 94, 2950 (1961)]. To a stirred mixture of 30 g. (0.169 mole) of β-imino-β-phenylthiopropionamide and 46.7 g. (0.36 mole) of potassium carbonate in 1.65 l. of ether was added a solution of 42.3 g. (0.37 mole) of iodine at 35° C. Stirring and refluxing were continued for another four hours. The reaction mixture was poured into 5 l. of ice water. The ethereal layer was dried over anhydrous sodium sulfate and evaporated to dryness to give 5-amino-3-phenylisothiazole. Yield 21 g. (71%); M.P. 160° C. (lit. 163° C.).

$\lambda_{max.}^{EtOH}$ 234 m$\mu$, ($\epsilon$ 6,000), 260 m$\mu$ ($\epsilon$ 8,900). $\nu_{max.}^{Nujol}$ 3480, 3300, 3180, 1615, 1530, 1413, 1395, 775 cm.$^{-1}$ Analysis.—Calcd. for $C_9H_8N_2S$ (percent): C, 61.31; H, 4.58; N, 15.90. Found (percent): C, 61.55, 61.69; H, 4.32, 4.11; N, 15.61, 15.67.

5-amino-4-bromo-3-phenylisothiazole. — The preparation of 5-amino-4-bromo-3-phenylisothiazole followed the procedure used for 5-amino-4-bromo-3-methylisothiazole by D. Buttimore et al. (J. Chem. Soc. 1963, 2032). A solution of 30 g. (0.17 mole) of 5-amino-3-phenylisothiazole in 100 ml. of acetic acid and 300 ml. of benzene was brominated with 28 g. (0.175 mole) of bromine at 5–10° C. The separated hydrobromide was collected by filtration and stirred with excess 2 N sodium carbonate solution for three hours at room temperature to give the free base, 5-amino-4-bromo-3-phenylisothiazole, which was recrystallized from ligroin. Yield 35 g. (81%); M.P. 80–82° C.

$\lambda_{max.}^{EtOH}$ 236 m$\mu$ ($\epsilon$ 12,500), 262 m$\mu$ ($\epsilon$ 12,300). $\nu_{max.}^{KBr.}$ 3440, 3300, 2980, 1610, 1530, 1450, 1420, 1385, 1280, 920, 770 705 cm.$^{-1}$ Analysis.—Calcd. for $C_9H_7BrN_2S$ (percent): C, 42.36; H, 2.77; N, 10.98. Found (percent): C, 43.19, 43.10; H, 2.81, 2.61; N, 10.71, 11.14.

4-bromo-3-phenylisothiazole.—The preparation of 4-bromo-3-phenylisothiazole followed the procedure used for 4-bromo-3-methylisothiazole by D. Buttimore et al. (J. Chem. Soc. 1963, 2032). A viscous solution of 57 g. (0.224 mole) of 5-amino-4-bromo-3-phenylisothiazole in 100 ml. of concentrated sulfuric acid and 110 ml. of concentrated phosphoric acid was diazotized with 17 g. (0.247 mole) of sodium nitrite in 60 ml. water at 0–5° C. in the usual manner. The diazotized solution was added dropwise to a stirred suspension of 2 g. cuprous oxide in 240 ml. hypophosphorous acid with cooling by water. Two additional 7 g. portions of cuprous oxide were added to the reaction mixture and stirring was continued for another one hour at room temperature. The reaction mixture was filtered with a "Dicalite" precoated filter and the residue was washed with 500 ml. ether. The filtrate was diluted with an equal volume of water and extracted with three 300 ml. portions of ether. The combined ethereal solution was washed with two 50 ml. portions of water and dried over anhydrous sodium sulfate. The ether was distilled off to give an oily residue, which was recrystallized from petroleum ether using active carbon. Yield 39 g. (73%) of 4-bromo-3-phenylisothiazole. M.P. 53–54° C.

$\lambda_{max.}^{EtOH}$ 274.5 m$\mu$ ($\epsilon$ 11,800). $\nu_{max.}^{KBr.}$ 1480, 1445 1390, 1200, 940 cm$^{-1}$ Analysis.—Calcd. for $C_9H_6BrNS$ (percent): C, 45.01; H, 2.53; N, 5.80. Found (percent): C, 45.36, 45.46; H, 2.65, 2.35; N, 6.80, 7.59.

4-cyano-3-phenylisothiazole.—A mixture of 21 g. (0.087 mole) 4-bromo-3-phenylisothiazole, 9.0 g. (0.1 mole) cuprous cyanide and 200 ml. γ-picoline was refluxed for 15 hours. The reaction mixture was poured into 200 ml. ice water, acidified with concentrated hydrochloric acid and extracted with three 100 ml. portions of ether. The ethereal solution was washed with 20 ml. portions of water, dried over anhydrous sodium sulfate and evaporated to give an oil, which was crystallized from ligroin. Yield 12 g. (74%) of 4-cyano-3-phenylisothiazole. M.P. 54–55° C.

$\lambda_{max.}^{EtOH}$ 256.5 m$\mu$ ($\epsilon$ 11,800), 273 m$\mu$ ($\epsilon$ 10,500). $\nu_{max.}^{KBr}$ 2280, 1490, 1450, 1410, 1340, 1010, 875, 775 cm$^{-1}$ $\tau$ (in CCl$_4$, 60 mc.) 2.16 (multiplet, 5H), 0.87 (singlet, 1H).

*Analysis.*—Calcd. for C$_{10}$H$_6$N$_2$S (percent): C, 64.49; H, 3.25; N, 15.04. Found (percent): C, 64.76, 64.55; H, 3.34, 3.53; N, 15.08.

4-cyano-5-methyl-3-phenylisothiazole. — The preparation followed the procedure used for 4-bromo-3,5-dimethylisothiazole by D. Buttimore et al. (J. Chem. Soc. 1963, 2032). To a stirred solution of 18.6 g. (0.1 mole) 4-cyano-3-phenylisothiazole in 100 ml. dry tetrahydrofuran was added n-butyl lithium solution from 2.7 g. (0.4 atom) lithium, 30 g. (0.22 mole) n-butylbromide and 100 ml. of dry ether at −70° C. After the addition was completed, stirring was continued for another one hour at −70° C. and then 28 g. (0.2 mole) methyl iodide was added dropwise to the chilled reaction mixture at the rate that the temperature did not rise above −65° C. Stirring was continued for another two hours at −60° C. and the temperature was allowed to rise to room temperature. The reaction mixture was treated with 100 ml. water and acidified with concentrated hydrochloric acid. The water layer was extracted with 100 ml. ether. The combined ethereal solution was washed with 20 ml. portions of water, dried over anhydrous sodium sulfate and distilled to leave a brown viscous oil which was fractionated in vacuo. The fraction boiling at 110–125° C./0.2 mm. (8.3 g.) was collected. The oil was crystallized from ligroin to give 4.4 g. of crystals of 4-cyano-5-methyl-3-phenylisothiazole, M.P. 72–73° C.

$\lambda_{max.}^{EtOH}$ 230 m$\mu$ ($\epsilon$ 13,600), 262 m$\mu$ ($\epsilon$ 11,900). $\nu_{max.}^{KBr}$ 2280, 1510, 1460, 1405, 1380, 790, 720 cm$^{-1}$ $\tau$ (in CCl$_4$, 60 mc.) 7.26 (singlet, 3H), 2.20 (multiplet, 5H).

*Analysis.*—Calcd. for C$_{11}$H$_8$N$_2$S (percent): C, 65.97; H, 4.03; N, 13.99. Found (percent): C, 66.14, 66.04; H, 4.05, 4.37; N, 14.02.

5-methyl-3-phenylisothiazole-4-carboxamide.—A solution of 100 mg. (0.5 mmole) of 4-cyano-5-methyl-3-phenylisothiazole in 2 ml. of concentrated sulfuric acid was warmed at 60–70° C. on a water bath for three hours. The reaction mixture was poured onto 10 g. of ice. The separated product was collected by filtration, washed with water and recrystallized from benzene. Yield 80 mg. (73%) of 5 - methyl-3-phenylisothiazole-4-carboxamide, M.P. 194–196° C. in a sealed tube.

$\lambda_{max.}^{EtOH}$ 269.5 m$\mu$ ($\epsilon$ 14,000). $\nu_{max.}^{KBr}$ 3420, 3200, 1640, 1525, 1440, 1385, 1360, 1110 cm.$^{-1}$.

*Analysis.*—Calcd. for C$_{11}$H$_{10}$N$_2$OS (percent): C, 60.53; H, 4.62; N, 12.84. Found (percent): C, 60.54, 60.93; H, 4.97, 4.64; N, 12.92.

5-methyl - 3 - phenylisothiazole-4-carboxylic acid.—A solution of 3.82 g. (0.019 mole) of 4-cyano-5-methyl-3-phenylisothiazole in 76 ml. of concentrated sulfuric acid was warmed on a water bath at 60–70° C. for three hours. To the stirred reaction mixture was added dropwise 2 g. (0.029 mole) sodium nitrite in 5 ml. water at 0–10° C. and stirring was continued for another one hour at 10° C. and for two hours at 50–60° C. The reaction mixture was poured onto 200 g. crushed ice and the separated crystals were collected by filtration. Yield 3.3 g. (80%) of 5 - methyl-3-phenylisothiazole-4-carboxylic acid. The analytical sample was recrystallized from benzene-ligroin (2:3), M.P. 151–153° C.

$\lambda_{max.}^{EtOH}$ 263 m$\mu$ ($\epsilon$ 10,600). $\nu_{max.}^{KBr}$ 1675, 1500, 1440, 1370, 1300, 950 cm.$^{-1}$.

$\tau$ (in CD$_3$COCD$_3$, 60 mc.) 7.84 (singlet, 3H), 3.84 (singlet, broad, 1H), 3.0 (multiplet, 5H).

*Analysis.*—Calcd. for C$_{11}$H$_9$NO$_2$S (percent): C, 60.25; H, 4.14; N, 6.39. Found (percent): C, 60.51, 60.57; H, 4.07, 4.42; N, 6.41.

5 - methyl-3-phenylisothiazole-4-carbonyl chloride.—A mixture of 3.2 g. (0.0147 mole) 5-methyl-3-phenylisothiazole-4-carboxylic acid and 5 ml. thionyl chloride was warmed on a water bath at 70–80° C. for one hour. The excess thionyl chloride was removed by distillation under reduced pressure to give an oil which was distilled in vacuo. Yield 3.2 g. (95%) of 5-methyl-3-phenylisothiazole-4-carbonyl chloride, B.P. 122–125° C./0.6 mm.

$\nu_{max.}^{liquid}$ 1770, 1490, 1450, 1400, 1360, 1230, 1105 cm.$^{-1}$.

Sodium 6-(5-methyl - 3 - phenylisothiazole-4-carboxamido)penicillanate.—A solution of 3.2 g. (0.0136 mole) 5-methyl-3-phenylisothiazole-4-carbonyl chloride in 5 ml. methylene chloride was added over a period of two minutes to a rapidly stirred solution of 3 g. (0.0138 mole) 6-aminopenicillanic acid and 3.0 g. (0.03 mole) triethylamine in 50 ml. methylene chloride at 5–10° C. The reaction mixture was stirred for one hour at 15° C. and extracted with three 50 ml. portions of water. The combined water extracts were washed with two 50 ml. portions of ether, layered with 100 ml. ethyl acetate and adjusted to pH 2 with 10% hydrochloric acid. The ethyl acetate layer was separated and the water layer was again extracted with two 100 ml. portions of ethyl acetate. The combined ethyl acetate extracts were washed with 50 ml. water, dried with sodium sulfate, filtered (an additional 50 ml. ethyl acetate was used for washing the flask and filter) and treated with 4 ml. of 39% sodium 2-ethylhexanoate in methyl isobutyl ketone. The clear solution was evaporated to a volume of about 200 ml. and the separated fine needles of sodium 6 - (5 - methyl-3-phenylisothiazole-4-carboxamido)penicillanate (Crop A) were collected by filtration. A second crop (Crop B) was obtained from the filtrate by an addition of dry ether. Yield: A, 1.97 g. (33%); B, 0.38 g. (6%), M.P.: A, 184–190° C. (dec.); B, 180–190° C. (dec.).

$\lambda_{max.}^{H_2O}$ 266.5 m$\mu$ ($\epsilon$ 11,200), $\nu_{max.}^{H_2O}$ 1780, 1665, 1615, 1540, 1410, 1330 cm.$^{-1}$.

*Analysis.*—Calcd. for C$_{19}$H$_{18}$N$_3$O$_4$S$_2$Na·H$_2$O (percent): C, 49.88; H, 4.11; N, 9.19. Found (percent): C, 50.31, 49.69; H, 4.91, 4.61; N, 9.02, 9.23.

This compound in vitro exhibited Minimum Inhibitory Concentrations of 0.4–0.8 mcg./ml. vs. *Staphylococcus aureus* Smith and of 0.8 mcg./ml. vs. benzylpenicillin-resistant *Staphylococcus aureus* Bx-1633-2 and in mice versus *S. aureus* Bx-1633-2 exhibited a CD$_{50}$ of about 1.56 mgm./kg. upon intramuscular injection. This compound was also very stable in aqueous acid, having a half-life of 4 hours at pH 2.0.

ALTERNATE PREPARATION OF 5-METHYL-3-PHENYLISOTHIAZOLE-4-CARBOXYLIC ACID

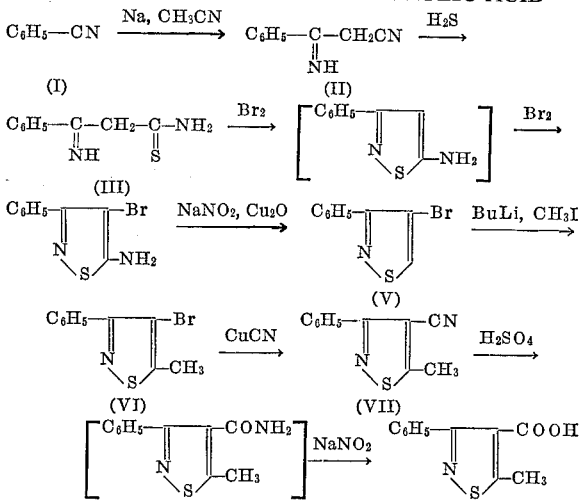

β-Imino-β-phenylpropionitrile (II). — This compound was prepared by the procedure described above by using 700 g. (6.8 moles) benzonitrile, 557 g. (13.6 moles) acetonitrile and a dispersion of 312 g. (13.6 atoms) of metallic sodium in each 2 liters of toluene and benzene. Yield 510 g. (52%).

β - Imino-β-phenylthiopropionamide (III).—A solution of 1340 g. (9.3 moles) β-imino-β-phenylpropionitrile in 13 liters of methylene chloride was placed in a 20-liter stainless steel bottle. The bottle was chilled at −10° C. and hydrogen sulfide gas was bubbled into the solution until the weight increased by 1.68 kg. After 18.5 g. of potassium hydroxide was added, the container was stoppered tightly and allowed to stand at room temperature for three days. The reaction mixture was cooled to −10° C. and the stopper was opened. The crystals which separated were collected by filtration and washed with ether. Yield 972 g. (59%).

5 - amino-4-bromo - 3 - phenylisothiazole (IV).—This compound was prepared directly from β-imino-β-phenylthiopropionamide without the isolation of 5 - amino - 3 - phenylisothiazole.

A suspension of 800 g. (4.5 moles) thioamide in 7.5 liters of ethanol was stirred and 2160 g. (13.5 moles) of bromine was added dropwise at about 10° C. over a period of two hours. After the addition was completed, the stirring was continued for one hour. The product, 5-amino-4-bromo-3-phenylisothiazole, separated as the hydrobromide, which was collected by filtration and washed with 3 liters of cold ethanol. The hydrobromide (1059 g.) was suspended in 5 liters of water and to the stirred suspension was added 5 liters of 10% sodium carbonate solution. Stirring for two hours at room temperature changed it into the free base, which was collected by filtration, washed with water and air-dried. Yield 723 g. (62%).

4-bromo - 3 - phenylisothiazole (V)—. Deamination of 5-amino - 4 - bromo - 3 - phenylisothiazole to 4 - bromo-3-phenylisothiazole was carried out as described above.

5-amino-4-bromo - 3 - phenylisothiazole (400 g., 1.57 moles) in 785 ml. of concentrated sulfuric acid and 785 ml. of concentrated phosphoric acid was diazotized with 120 g. (1.75 moles) of sodium nitrite in 300 ml. water at 0° C. The diazotized solution was treated with a total of 23.5 g. cuprous oxide in 1.9 liters of hypophosphorous acid to give 254 g. (68%) of 4-bromo-3-phenylisothiazole.

4-bromo-5-methyl - 3 - phenylisothiazole (VI).—In the previous procedure the introduction of the 5-methyl group to the isothiazole ring was made after the conversion of the 4-bromo group into the 4-cyano group. The sequence was reversed in the present preparation.

To a stirred solution of 240 g. (1 mole) of 4-bromo-3-phenylisothiazole in 500 ml. of dry tetrahydrofuran was added n-butyl lithium solution from 19.5 g. (2.8 atoms) lithium, 192 g. (1.4 moles) n-butyl bromide and 500 ml. of dry ether over a period of two hours at −70° C. After the addition was completed stirring was continued for another one hour at −70° C. Then 185 g. (1.3 mole) of methyl iodine was added dropwise to the cold solution at the rate that the temperature did not rise above −40 ° C. Stirring was continued for two hours at −40° C. and the temperature was allowed to rise to room temperature. The reaction mixture was cooled to −10° C., acidified with 50 ml. of 10% hydrochloric acid and then 1 liter of water was added. The aqueous layer was extracted three times with 200 ml. ether and the combined ethereal solution was washed with water and dried over anhydrous sodium sulfate. The solvent was removed and the residue was distilled under diminished pressure. The fraction boiling at 105–150° C./0.5 mm. was collected and allowed to stand at room temperature. The crystals which separated were filtered to give 65.9 g. of the product. An additional amount (58.4 g.) of the product was obtained from the filtered oil by crystallization from petroleum ether. Total yield 105.3 g. (41%). MP. 44–45° C. (recrystallized from petroleum ether).

$\lambda^{EtOH}_{max.}$ 273.5 mμ (ε 12,800) $\nu^{KBr}_{max.}$ 1490, 1440, 1390, 1345, 1020, 910, 770 cm.$^{-1}$

*Analysis.*—Calcd. for $C_{10}H_8BrNS$ (percent): C, 47.25; H, 3.17; N, 5.51. Found (percent): C, 47.69, 47.51; H, 3.16, 3.45; N, 6.07.

4-cyano-5-methyl-3-phenylisothiazole (VII).—A mixture of 101.6 g. (0.4 mole) of 4-bromo-5-methyl-3-phenylisothiazole 43 g. (0.48 mole) of cuprous cyanide and 300 ml. γ-picoline was refluxed overnight. The reaction mixture was poured into 2 liters of ice water, acidified with 300 ml. of concentrated hydrochloric acid and filtered with a "Dicalite" (diatomaceous earth) precoated filter. The filtrate was extracted with three 700 ml. portions of ether. The ethereal extracts were washed with water, dried over anhydrous sodium sulfate and evaporated to give an oil, which was crystallized from ligroin. Yield 48.5 g. (61%).

5-methyl-3-phenylisothiazole-4-carboxylic acid (VIII).—The preparation of the isothiazole acid was carried out by the procedure described above. 4-cyano-5-methyl-3-phenylisothiazole (38.5 g., 0.19 mole) was subjected to heating with 200 ml. of concentrated sulfuric acid at 70° C. followed by treating with 14 g. of sodium nitrite in 30 ml. water at 0° C. The product weighed 34.8 g. (87%). The IR spectrum was quite different from that reported previously, although the UV spectrum was exactly the same. M.P. 151–153° C.

$\lambda^{EtOH}_{max.}$ 263 mμ, (ε 10,500). $\nu^{KBr}_{max.}$ 1730. 1450, 1260, 1170, 1135 cm.$^{-1}$ However, a recrystallization from carbon tetrachloride gave colorless needles which showed the same IR spectrum as that of the previous one. M.P. 151–153° C.

$\lambda^{EtOH}_{max.}$ 263 mμ (ε 10,600). $\nu^{KBr}_{max.}$ 1670, 1500, 1435, 1300, 945 cm.$^{-1}$ The admixture of the products before and after the recrystallization melted at 145–151° C.

EXAMPLE 2

Substitution in the procedure of Example 1 for the aniline used therein of one mole of 2,6-dichloroaniline produces sodium 6-[5-methyl-3-(2',6' - dichlorophenyl)isothiazole-4-carboxamido]penicillanate.

EXAMPLE 3

Substitution in the procedure of Example 1 for the aniline used therein of one mole of 2-chloroaniline produces sodium 6-[5 - methyl - 3 -(2' - chlorophenyl) - isothiazole - 4 - carboxamido]penicillanate.

EXAMPLE 4

Substitution in the procedure of Example 1 for the aniline used therein of one mole of 4-trifluoromethylaniline produces sodium 6 - [5 - methyl - 3 - (4' - trifluoromethylphenyl) - isothiazole - 4 - carboxamido]penicillanate.

EXAMPLE 5

Substitution in the procedure of Example 1 for the aniline used therein of one mole of 2,6-di(trifluoromethyl)-aniline produces sodium 6 - [5 - methyl - 3 - (2',6' - di{trifluoromethyl}-phenyl)-4-carboxamido]penicillanate.

EXAMPLE 6

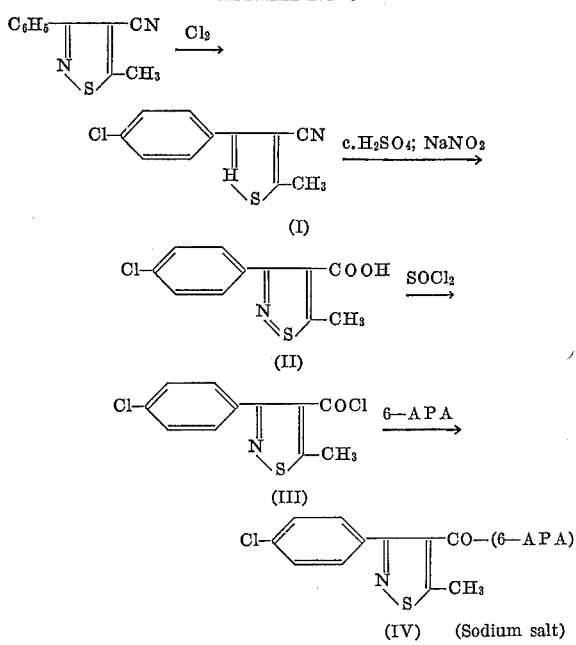

3-p-chlorophenyl-4-cyano-5-methylisothiazole (I).—A slow stream of chlorine was passed through a melted mixture of 9.2 g. (0.046 mole) of 4-cyano-5-methyl-3-phenylisothiazole and 3.0 g. (0.013 mole) of antimony trichloride at 80–90° C. for 2 hours. The reaction mixture was dissolved in 50 ml. of chloroform, washed with water, dried with sodium sulfate and the solvent was distilled off. The residual oil was treated with ligroin and the chlorinated product was first precipitated from the solution. The product was filtered. Concentration of the filtrate gave the starting material, which was repeatedly chlorinated in the similar way. Recrystallization of the product from ligroin gave 3-p-chlorophenyl-4-cyano-5-methylisothiazole as needles. Yield 1.15 g. (10%), M.P. 114–115° C.

$\lambda_{max.}^{EtOH}$ 267 m$\mu$ ($\epsilon$ 16,200). $\nu_{C\equiv N}$ 2260 cm.$^{-1}$ NMR (100 mc., in CCl$_4$, ref. TMS): $\tau$ (p.p.m.): CH$_3$ 7.24 (s.); ring protons (AB type) 2.55 (d.), 2.00 (d.), $J_{AB}$ 8.4 c.p.s.

Analysis.—Calcd. for C$_{11}$H$_7$ClN$_2$S (percent): C, 56.29; H, 3.01; N, 11.94. Found (percent): C, 56.02; H, 2.71; N, 11.86.

3-p-chlorophenyl-5-methylisothiazole-4-carboxylic acid (II).—A mixture of 730 mg. (3.1 mmoles) of 3-p-chlorophenyl-4-cyano-5-methylisothiazole and 20 ml. of conc. sulfuric acid was heated on a water bath at 70–80° C. for 4 hours. Then the mixture was cooled and a solution of 250 mg. (3.6 mmoles) of sodium nitrite in 5 ml. of water was added dropwise with stirring at 0–7° C. The reaction mixture was stirred at room temperature for 30 minutes, then at 50–70° C. for 30 minutes and poured on to 150 g. of crushed ice. The precipitate was collected by filtration, dissolved in aqueous sodium bicarbonate and the solution was filtered. Acidification with dil. hydrochloric acid gave the product, 3-p-chlorophenyl-5-methylisothiazole-4-carboxylic acid, which was recrystallized from aqueous ethanol (1:1). Yield 700 mg. (89%), M.P. 164–165° C.

$\lambda_{max.}^{EtOH}$ 262 m$\mu$ ($\epsilon$ 13,500) $\cdot \nu_{C=O}$ 1725 cm.$^{-1}$ Analysis.—Calcd. for C$_{11}$H$_8$ClNS (percent): C, 52.07; H, 3.18; N, 5.52. Found (percent): C, 52.03, 52.09; H, 2.87, 3.13; N, 6.29, 6.15.

3-p-chlorophenyl-5-methylisothiazole-4 - carbonyl chloride (III).—A mixture of 600 mg. (2.36 mmoles) of 3-p-chlorophenyl-5-methylisothiazole-4-carboxylic acid and 5 ml. of thionyl chloride was heated at 60–80° C. for 30 minutes on a water bath. The excess thionyl chloride was removed by distillation under reduced pressure and the residual, solid 3-p-chlorophenyl-5 - methylisothiazole - 4-carbonyl chloride, was recrystallized from benzene-petroleum ether. Yield 620 mg. (97%), M.P. 62–63° C. $\nu_{C=O}$ 1754 cm.$^{-1}$.

Sodium 6-(3-p-chlorophenyl-5-methylisothiazole-4 - carboxamido)penicillanate (IV).—To a stirred solution of 600 mg. (2.8 mmoles) of 6-aminopenicillanic acid (6-APA), 700 mg. (8 mmoles) sodium bicarbonate, 45 ml. water and 50 ml. acetone was added dropwise a solution of 620 mg. (2.28 mmoles) 3-p-chlorophenyl-5-methylisothiazole-5-carbonyl cholride in 20 ml. dry acetone at 0–2° C. The reaction mixture was stirred for 15 minutes at 10–15° C., washed twice with 100 ml. portions of ether, layered with 100 ml. ethyl acetate and adjusted to pH 2.0 with dil. hydrochloric acid at 2° C. under stirring. The organic layer being separated, the water layer was extracted twice with 50 ml. portions of ethyl acetate. The combined ethyl acetate extracts were washed twice with 50 ml. portions of water and dried with anhydrous sodium sulfate. The filtrate was concentrated to about 50 ml. under reduced pressure at 30° C. The concentrate was treated with 1.2 ml. of 39% sodium 2-ethylhexanoate (SEH). Scrubbing the flask for about 30 minutes effected crystallization. The crystals of sodium 6-(3-p-cholrophenyl-5-methylisothiazole-4-carboxamido)penicillanate were collected by filtration, washed with ethyl acetate and dried in vacuum over phosphorus pentoxide. Yield 870 mg. (80%), M.P. 192–197° C. (dec.).

$\lambda_{max.}^{H_2O}$ 268 m$\mu$ ($\epsilon$ 14,400). $\nu_{max.}^{KBr}$ 1770, 1635, 1605, 1405 cm.$^{-1}$ Analysis.—Calcd. for C$_{19}$H$_{17}$ClN$_3$O$_4$S$_2$Na·$\frac{3}{2}$H$_2$O (percent): C, 45.56; H, 4.02; N, 8.39. Found (percent): C, 45.64, 45.68; H, 4.02, 4.19; N, 8.88, 8.73.

This penicillin in vitro exhibited Minimum Inhibitory Concentrations of about 0.125 mcg./ml. vs. Staph. aureus Smith and of about 0.4 mcg./ml. vs. benzylpenicillin-resistant. S. aureus Bx-1633-2 and in mice vs. both S. aureus Smith and S. aureus Bx-1633-2 exhibited a CD$_{50}$ of about 18 mgm./kg. upon intramuscular injection. This penicillin was also very stable in aqueous acid, having a half-like of 4.3 hours at pH 2 and 37° C.

EXAMPLE 7

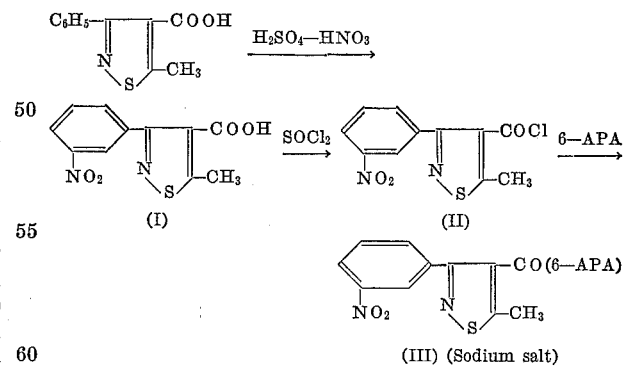

5 - methyl-3-m-nitrophenylisothiazole-4-carboxylic acid (I).—To a stirred solution of 1.32 g. (6 mmoles) of 5-methyl-3-phenylisothiazole-4-carboxylic acid in 10 ml. of conc. sulfuric acid was added dropwise 450 mg. (7 mmoles) of fuming nitric acid in 5 ml. of conc. sulfuric acid at −10° C. The reaction mixture was stirred for one hour at 10° C. and poured onto 100 g. of crushed ice. The precipitated 5-methyl-3-m-nitrophenylisothiazole-4-carboxylic acid was filtered, washed with water and recrystallized from ethanol. Yield 1.32 g. (80%), M.P. 235–236° C.

$\lambda_{max.}^{EtOH}$ 260 m$\mu$ ($\epsilon$ 18,000). $\nu_{max.}^{Nujol}$ 1680, 1530, 1354 cm.$^{-1}$ NMR (100 mc., in D$_2$O+K$_2$CO$_3$, intl. ref. DOH): $\delta$ (c.p.s.): CH$_3$, +207 (s.); ring protons, H$_2$-380 (t.), H₄-361 (q.) H₅-301 (t.), H₆-336 (q.), $J_{H_4H_5}=J_{H_5H_6}=8$ c.p.s.; $J_{H_2H_6}=J_{H_2H_4}=1$ c.p.s., $J_{H_4H_6}=\sim 0$ c.p.s.

*Analysis*—Calcd. for $C_{11}H_8N_2O_4S$ (percent): C, 49.99; H, 3.05; N, 10.64. Found (percent): C, 49.56, 49.68; H, 2.93; 2,67; N, 10.51, 10.98.

5 - methyl - 3 - m-nitrophenylisothiazole-4-carbonyl chloride (II).—A mixture of 900 mg. (3 mmoles) of 5-methyl-3-m-nitrophenylisothiazole-4-carboxylic acid and 5 ml. of thionyl chloride was heated on a water bath at 80° C. for 30 minutes. The excess thionyl chloride was removed by distillation under reduced pressure. The residual, solid 5-methyl-3-m-nitrophenylisothiazole-4-carbonyl chloride, was recrystallized from dry benzene. Yield 820 mg. (98%), M.P. 122–123° C. $\nu_{C=O}$ 1740 cm.⁻¹.

Sodium 6 - (5 - methyl-3-m-nitrophenylisothiazole-4-carboxamido)penicillanate (III).—To a stirred solution of 700 mg. (3.24 mmoles) of 6-APA, 800 mg. (9.5 mmoles) of sodium bicarbonate, 25 ml. of water and 25 ml. of acetone was added dropwise 820 mg. (2.9 mmoles) of 5-methyl-3-m-nitrophenylisothiazole-4-carbonyl chloride in 30 ml. of dry benzene at 0–5° C. The reaction mixture was stirred for 30 minutes at 10° C. washed twice with 100 ml. portions of ether, covered with 100 ml. of ethyl acetate and adjusted to pH 2.0 with dil. hydrochloric acid at 5° C. The organic layer was separated and the water layer was extracted twice with 50 ml. portions of ethyl acetate. The combined ethyl acetate extracts were washed twice with 50 ml. portions of water and dried with anhydrous sodium sulfate. The filtrate being concentrated to 50 ml. under reduced pressure at 30° C., the concentrate was treated with 1.4 ml. of 39% SEH and stirred for 3 hours at room temperature. The separated product, sodium 6-(5-methyl-3-m-nitrophenylisothiazole-4-carboxamido)penicillanate, was collected by filtration, washed with ethyl acetate and dried in vacuum over phosphorus pentoxide. Yield 950 mg. (67%), M.P. 220–225° C. (dec.).

$\lambda_{max.}^{H_2O}$ 265 m$\mu$ ($\epsilon$ 19,300). $\nu_{max.}^{KBr.}$ 1760, 1625, 1600, 1400 cm⁻¹

*Analysis*.—Calcd. for $C_{19}H_{17}N_4O_6S_2Na \cdot 2H_2O$ (percent): C, 43.85; H, 4.07; N, 10.77. Found: C, 43.76, 43.76; H, 3.57, 3.49; N, 11.36, 11.43.

This penicillin in vitro exhibited Minimum Inhibitory Concentrations of about 0.4 mcg./ml. vs. *S. aureus* Smith and of about 1.6 mcg./ml. versus benzylpenicillin-resistant *S. aureus* Bx–1633-2 and was also very stable in aqueous acid, having a half-life of greater than 5 hours at pH 2 and 37° C.

EXAMPLE 8

5 - amino - 4 - bromo - 3 - phenylisothiazole.—5-amino-4-bromo-3-phenylisothiazole, an intermediate to 4-cyano-5-methyl-3-phenylisothiazole, was described above in Example 1 as having M.P. 80–82° C. this aminoisothiazole was obtained in a purer state by recrystallizations from methylene chloride and then ligroin; M.P. 84–85° C.

$\lambda_{max.}^{EtOH}$ 236 m$\mu$ ($\epsilon$ 11,200), 259 m$\mu$ ($\epsilon$ 11,200)

*Analysis*. — Calcd. for $C_9H_7BrN_2S$ (percent): C, 42.36; H, 2.77; N, 10.98. Found (percent): C, 42.38, 42.30; H, 2.69, 2.95; N, 11.02, 11.11.

3-o-chlorophenyl-4-cyano-5-methylisothiazole (I).—A slow stream of chlorine was passed through a mixture of 54.6 g. (0.27 mole) of 4-cyano-5-methyl-3-phenylisothiazole and 13 g. (0.057 mole) of antimony trichloride at 120° C. for 5 hours. The reaction mixture was dissolved in 200 ml. of chloroform, washed with 50 ml. of 10% hydrochloric acid and then with aqueous sodium bicarbonate solution. The chloroform solution was dried with anhydrous sodium sulfate and the solvent was evaporated under reduced pressure to afford the oil, which was dissolved in hot ligroin. The solution was treated with active carbon and allowed to cool at room temperature to separate the p-chloro derivative. Yield 17 g. (26.6%). Evaporation of the filtrate gave a mixture of p-chloro, o-chloro, polychloro (including 2,4-dichloro) and unchlorinated derivatives. The mixture was recrystallized from ligroin and 4.8 g. (7.5%) of pure o-chloro derivative, 3-o-chlorophenyl-4-cyano-5-methylisothiazole, was obtained, M.P. 75–76° C.

$\lambda_{max.}^{EtOH}$ 260.5 m$\mu$ ($\epsilon$ 8,700)

NMR (100 mc.: in CCl₄, ref. TMS): $\tau$ (p.p.m.) 7.26 (s., 5-CH₃), 2.62 (m, phenyl ring protons).

*Analysis*.—Calcd. for $C_{11}H_7ClN_2S$ (percent): C, 56.29; H, 3.01; N, 11.94. Found (percent): C, 56.97, 57.11; H, 3.67, 3.24; N, 11.65, 11.88.

3-o-chlorophenyl-5-methylisothiazole-4-carboxylic acid (II).—A mixture of 4.0 g. (0.017 mole) of 3-o-chlorophenyl-4-cyano-5-methylisothiazole and 50 ml. of conc. sulfuric acid was heated at 80° C. for 4 hours on a water bath. The mixture was chilled and 1.53 g. (0.022 mole) of sodium nitrite in 4 ml. of water was added dropwise with stirring at 0–5° C. The reaction mixture was stirred at room temperature for 30 minutes and at 70° C. for 30 minutes until evolution of nitrogen ceased and poured onto crushed ice to give the product, 3-o-chlorophenyl-5-methylisothiazole-4-carboxylic acid, which was recrystallized from ethanol and water (1:1). Yield 3.7 g. (86%), M.P. 170–172° C. (in sealed tube).

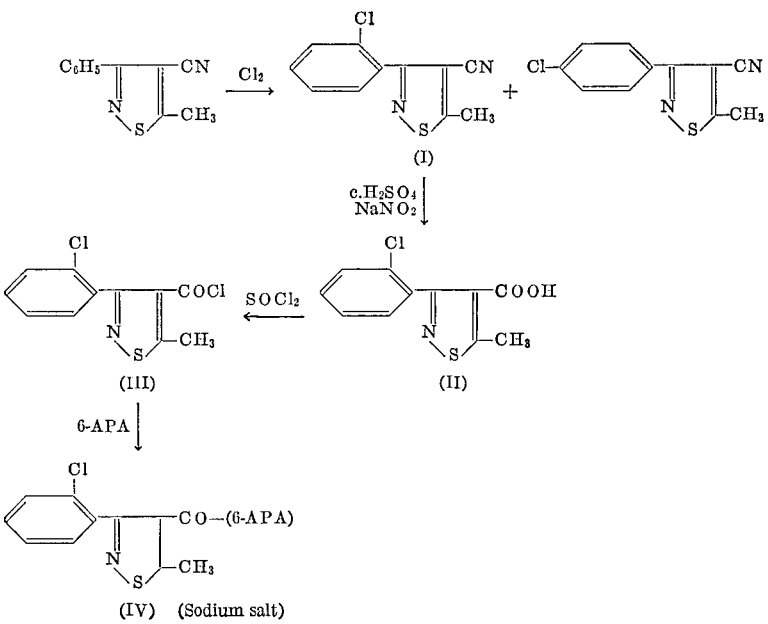

$\nu_{max.}^{Nujol}$ 1670 cm.$^{-1}$. $\lambda_{max.}^{EtOH}$ 256 m$\mu$ ($\epsilon$ 9,500)

NMR (100 mc.; in D$_2$O+K$_2$CO$_3$). $\delta$ (c.p.s. from DOH) +199 (s., 5-CH$_3$) —280 (m., phenyl ring protons).

*Analysis.*—Calcd. for C$_{11}$H$_8$ClNO$_2$S (percent): C, 52.07; H, 3.18; N, 5.52. Found (percent): C, 51.63, 51.46; H, 3.10, 3.16; N, 6.01, 5.80.

3-o-chlorophenyl-5-methylisothiazole-4-carbonyl chloride (III).—A mixture of 2.7 g. (0.0107 mole) of 3-o-chlorophenyl-5-methylisothiazole-4-carboxylic acid and 3 ml. of thionyl chloride was heated on a water bath at 80° C. for 30 minutes. The excess thionyl chloride was removed by distillation under reduced pressure and the residue was distilled in vacuum. Yield 2.55 g. (88%) of 3-o-chlorophenyl-5-methylisothiazole-4-carbonyl chloride, B.P. 130–135° C./3 mm.

$\nu_{max.}^{Liquid}$ 1760 cm.$^{-1}$

Sodium 6-(3-o-chlorophenyl-5-methylisothiazole-4-carboxamido)penicillanate (IV).—To a stirred mixture of 2.5 g. (0.0115 mole) of 6-APA, 2.9 g. (0.034 mole) of sodium bicarbonate, 80 ml. of water and 50 ml. of acetone was added dropwise a solution of 2.55 g. (0.0094 mole) of 3-o-chlorophenyl-5-methylisothiazole-4-carbonyl chloride in 30 ml. of dry acetone at 5° C. and stirring was continued for 30 minutes at 10–15° C. The reaction mixture was washed twice with 100 ml. portions of ether, layered with 100 ml. of ethyl acetate and adjusted to pH 2.0 with dil. hydrochloric acid at 5° C. The ethyl acetate layer being separated, the water layer was extracted with two 50 ml. portions of ethyl acetate. The combined ethyl acetate extracts were washed with water, dried with anhydrous sodium sulfate and evaporated to ¾ of its volume. The concentrate was treated with 35% SEH to give a crystalline precipitate of sodium 6-(3-o-chlorophenyl-5-methylisothiazole - 4 - carboxamido)penicillanate, which was collected by filtration. When the precipitate was washed with acetone, it showed a tendency to dissolve in the solvent. The remaining precipitate "B" (1.3 g.) was washed with ethyl acetate. On the other hand, to the acetone solution containing a part of sample was added five volumes of ethyl acetate. The resulting solution was concentrated slightly to give 1.6 g. of sodium 6-(3-chlorophenyl-5-methylisothiazole-4 - carboxamido)penicillanate crystals designated as "A." Crystalline forms "A" and "B" are different from each other in IR spectra but are almost the same in microbiological activities. "B" was also recrystallized from acetone and ethyl acetate to give 0.6 g. of crystals which show an IR spectrum identical with that of "A." Total yield 2.2 g. (50%).

"B": M.P. 182–188° C. (dec.). $\nu_{max.}^{KBr}$ 1760, 1650, 1595, 1530, 1405 cm.$^{-1}$. $\lambda_{max.}^{H_2O}$ 258 m$\mu$ ($\epsilon$ 9,100)

"A": M.P. 182–188° C. (dec.). $\nu_{max.}^{KBr}$ 3530, 3370, 1765, 1650, 1600, 1510, 1480, 1410 cm.$^{-1}$. $\lambda_{max.}^{H_2O}$ 257.5 m$\mu$ ($\epsilon$ 9,400)

*Analysis.*—Calcd. for C$_{19}$H$_{17}$ClN$_3$O$_4$S$_2$Na·$\frac{3}{2}$ H$_2$O (percent): C, 45.55; H, 4.02; N, 8.39. Found (percent): C, 45.31, 45.66; H, 3.83, 4.16; N, 8.45, 8.95.

Crystalline form "A" of this penicillin in vitro exhibited Minimum Inhibitory Concentrations of about 0.4 mcg./ml. versus *S. aureus* Smith and about 0.4 mcg./ml. versus benzylpenicillin-resistant *S. aureus* Bx–1633–2 and in mice upon intramuscular injection exhibited CD$_{50}$'s of about 72 mgm./kg. versus *S. aureus* Smith and about 200 mgm./kg. versus *S. aureus* Bx–1633–2. This penicillin was also very stable in aqueous acid, having a half-life of 3.3–3.7 hours at pH 2 and 37° C.

EXAMPLE 9

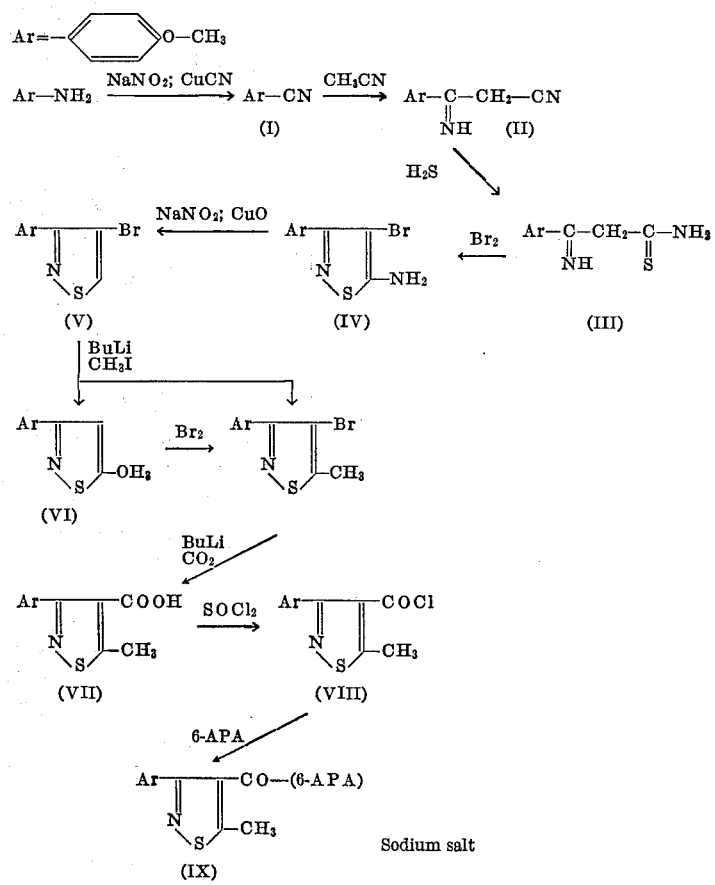

p-Methoxybenzonitrile (I).—The compound was prepared from p-anisidine according to the directions of Org. Syn. Coll., vol. 1, 514 (1941).

A mixture of 250 g. (2.03 moles) of p-anisidine and 670 ml. of 28% hydrochloric acid was diazotized with 150 g. (2.18 moles) of sodium nitrite in 400 ml. of water in the usual way at 0–5° C. The reaction mixture was neutralized with solid sodium carbonate. On the other hand, cuprous chloride was prepared from 625 g. (3.9 moles) of cupric sulfate, 163 g. (3.8 moles) of sodium chloride, 133 g. (1.28 moles) of sodium bisulfite and 3 l. of water. The cuprous chloride was converted to cuprous cyanide with 325 g. (5 moles) of potassium cyanide and 600 ml. of water. The cuprous cyanide solution was chilled to 0–5° C. and covered with 600 ml. benzene. The neutralized solution was added slowly over the period of one hour to the cold cuprous cyanide solution with stirring. The stirring was continued for another two hours at room temperature and the mixture was allowed to stand overnight. The reaction mixture was warmed to 50° C. and inorganic salt was removed by filtration. The benzene layer was separated and the water layer was extracted three times with 300 ml. portions of benzene. The combined benzene extracts were washed with water and evaporated under reduced pressure to give an oily residue, which was dissolved in 500 ml. of ether. The ethereal solution was filtered to remove insoluble materials. The solvent was removed by distillation and the residue was distilled in vacuum to give p-methoxybenzonitrile, yield 106 g. (39%), B.P. 105–125° C./6–7 mm., M.P. 43–46° C.

$\beta$-Imino-$\beta$-p-methoxyphenylpropionitrile (II).—The compound was prepared by the procedure used in Example 1 to prepare $\beta$-imino-$\beta$-phenylpropionitrile. To a gently refluxed mixture of 125 g. (5.4 moles) of powdered sodium, 1 l. toluene and 800 ml. benzene was added dropwise a solution of 22 g. (5.4 moles) acetonitrile and 360 g. (2.7 moles) p-methoxybenzonitrile in 500 ml. benzene over the period of 4 hours. The reaction mixture was stirred under reflux for another 30 hours and then allowed to stand until cool. The sodium salt which separated was collected by filtration and treated with 1.5 l. water to afford the free product, $\beta$-imino-$\beta$-p-methoxyphenylpropionitrile. The analytical sample was recrystallized from benzene. Yield 175 g. (31%). M.P. 113–114° C.

$\nu_{C\equiv N}$ 2250 cm.$^{-1}$. $\lambda_{max.}^{EtOH}$ 255 m$\mu$ ($\epsilon$ 12,700), 295 m$\mu$ ($\epsilon$ 18,400)

Analysis.—Calcd. for $C_{10}H_{10}N_2O$ (percent): C, 68.95; H, 5.79; N, 16.08. Found (percent): C, 68.70, 68.76; H, 6.08, 5.66; N, 15.97, 16.05.

$\beta$-Imino-$\beta$-p-methoxyphenylthiopropionamide (III).— A solution of 35 g. (0.2 mole) of $\beta$-imino-$\beta$-p-methoxyphenylpropionitrile in 350 ml. methylene chloride was placed in 500 ml. of a pressure bottle and 300 mg. of potassium hydroxide was added. The mixture was chilled with Dry Ice-acetone. Dry hydrogen sulfide gas was passed into the chilled solution until 27 g. (0.8 mole) of the gas was absorbed. The bottle was tightly stoppered and allowed to stand for three days at room temperature. The separated bright yellow crystals of $\beta$-imino-$\beta$-p-methoxyphenylthiopropionamide were collected by filtration and washed with ether. The analytical sample was recrystallized from methylene chloride. Yield 164 g. (80%). M.P. 179–180° C.

$\lambda_{max.}^{EtOH}$ 273 m$\mu$ ($\epsilon$ 11,000), 352 m$\mu$ ($\epsilon$ 7,900)

Analysis.—Calcd. for $C_{10}H_{12}N_2OS$ (percent): C, 57.66; H, 5.81; N, 13.45. Found (percent): C, 56.89, 57.19; H, 5.59, 5.60; N, 13.53, 13.72.

5-amino-4-bromo-3-p-methoxyphenylisothiazole (IV). —The compound was prepared according to the procedure used in Example 1 to prepare 5-amino-4-bromo-3-phenylisothiazole. To a stirred suspension of 150 g. (0.72 mole) of $\beta$-imino-$\beta$-p-methoxyphenylthiopropionamide in 1.2 l. of ethanol was added dropwise 360 g. (2.25 moles) of bromine at 15° C. over the period of one hour. The reaction mixture was stirred for another two hours at 20° C. The separated hydrobromide of the isothiazole derivative was filtered, washed with ethanol and dried in the air. The hydrobromide was added under stirring to 720 ml. of 2 N aqueous sodium carbonate and stirring was continued for two hours. The free product, 5-amino-4-bromo-3-p-methoxyphenylisothiazole, was filtered, washed with water and dried. The analytical sample was crystallized from ligroin. Yield 172 g. (75%). M.P. 109–111° C.

$\lambda_{max.}^{EtOH}$ 234 m$\mu$ ($\epsilon$ 12,000), 274 m$\mu$ ($\epsilon$ 18,000)

Analysis.—Calcd. for $C_{10}H_9BrN_2OS$ (percent): C, 42.12; H, 3.18; N, 9.82. Found (percent): C, 41.71, 41.89; H, 2.77, 2.79; N, 10.50, 10.28.

4-bromo-3-p-methoxyphenylisothiazole (V).—To a stirred solution of 160 g. (0.56 mole) of 5-amino-4-bromo-3-p-methoxyphenylisothiazole in 300 ml. of concentrated sulfuric acid and 300 ml. of concentrated phosphoric acid was added slowly a solution of 48.3 g. (0.7 mole) of sodium nitrite in 96 ml. of water at 0–5° C. The diazotized solution was added dropwise at 20° C. to a stirred mixture of 1.75 g. cuprous oxide and 750 ml. of 40% hypophosphorous acid over the period of one hour, during which four 1.75 g. portions of cuprous oxide was added. The reaction mixture was stirred another two hours at room temperature, allowed to stand overnight and filtered with a Dicalite-precoated filter. The coffee-black tarry cake was well-pressed and washed with 1 l. of chloroform. The filtrate was diluted with 1 l. of water and extracted with chloroform washings and with two additional 500 ml. portions of chloroform. The combined chloroform extracts were washed with water and evaporated under reduced pressure to give the oily residue, which was extracted with two 500 ml. portions of hot ligroin. The solvent was evaporated under reduced pressure and the residue was distilled in vacuum to give 4-bromo-3-p-methoxyphenylisothiazole. Yield 92 g. (61%). B.P. 142–165° C./0.8 mm. A sample of the product was crystallized from petroleum ether, M.P. 40–41° C., $\lambda_{max.}^{EtOH}$ 285 m$\mu$ ($\epsilon$ 14,300)

Analysis.—Calcd. for $C_{10}H_8BrNOS$ (percent): C, 44.46; H, 2.99; N, 5.19. Found (percent): C, 43.20, 43.56; H, 2.56, 2.72; N, 5.19, 5.39.

4-bromo-3-p-methoxyphenyl-5-methylisothiazole (VI). —(a) Methylation of 4-bromo-3-p-methoxyphenylisothiazole: A solution of 81 g. (0.3 mole) of 4-bromo-3-p-methoxyphenylisothiazole in 150 ml. of dry tetrahydrofuran (THF) was chilled to −70° C. with Dry Ice-acetone mixture. To the chilled solution was cautiously added a stirred solution of n-butyl lithium prepared from 7 g. (1 mole) of lithium, 70 g. (0.51 mole) of n-butyl bromide and 150 ml. of ether maintaining the temperature below −65° C. over the period of 3 hours. To the mixture was added 53.5 g. (0.42 mole) of methyl iodide in three portions, when the temperature rose to −30° C. The reaction mixture was allowed to stand overnight and poured into 30 ml. of 2 N hydrochloric acid. The ether layer was separated and the water layer was extracted with two 200 ml. portions of ether. The combined ethereal solution was washed with water and dried with anhydrous sodium sulfate, the solvent being evaporated. The residual oil was distilled in vacuum to give 62 g. of colorless oil boiling at 170–185° C./5 mm. The product showed two strong peaks by GLC. The product was treated with hot ligroin to afford crystalline 3-p-methoxyphenyl-5-methylisothiazole. Yield 12.25 g. (18%). M.P. 82–83° C.

$\lambda_{max.}^{EtOH}$ 282 m$\mu$ ($\epsilon$ 18,700)

NMR (100 mc.; in CCl$_4$; TMS): $\tau$ (p.p.m.) 7.50 (s., 5-CH$_3$), 6.27 (s., OCH$_3$), 3.22 (d., 3-H on phenyl ring), 2.92 (s., 4-H on isothiazole ring), 2.22 (d., 2-H on phenyl ring). $J_{2H,3H}=9.7$ c.p.s.

Analysis.—Calcd. for $C_{11}H_{11}NOS$ (percent): C, 64.36; H, 5.40; N, 6.82. Found (percent): C, 64.68, 64.76; H, 5.53, 5.53; N, 6.58, 6.40.

The mother liquor was evaporated into dryness and the residue was distilled under reduced pressure to give 4 - bromo-3-p-methoxyphenyl-5-methylisothiazole boiling at 148–156° C./1.3 mm. Yield 28 g. (32.8%).

$\lambda_{max.}^{EtOH}$ 282 m$\mu$ ($\epsilon$ 17,300)

NMR (100 mc.; in $CCl_4$; TMS): $\tau$ (p.p.m.) 7.49 (s., 5-$CH_3$), 6.19 (s., $OCH_3$), 3.09 (d., 3-H on phenyl ring), 2.24 (d., 2-H on phenyl ring). $J_{2H,3H}=9.7$ c.p.s.

(b) Bromination of 3-p-methoxyphenyl-5-methylisothiazole: To a stirred solution of 10.7 g. (0.053 mole) of 3-p-methoxyphenyl-5-methylisothiazole and 4 g. (0.08 mole) of anhydrous sodium acetate in acetic acid was added 10.6 g. (0.066 mole) of bromine at room temperature and stirring was continued for 3 hours. The reaction mixture was evaporated under reduced pressure. The residue was dissolved in 50 ml. of water and extracted with two 50 ml. portions of ether. The combined ethereal solution was washed with aqueous sodium bicarbonate, dried with anhydrous sodium sulfate and evaporated into dryness. The residue was dissolved in hot ligroin. On cooling the solution gave 2.7 g. (14%) of 4-bromo-3-(3-bromo-4-methoxyphenyl)-5-methylisothiazole melting at 105–106° C.

$\lambda_{max.}^{EtOH}$ 282 m$\mu$ ($\epsilon$ 16,900)

NMR (100 mc.; in $CCl_4$; TMS): $\tau$ (p.p.m.) 7.45 (s., 5-$CH_3$), 6.04 (s., $OCH_3$), 3.16 (d., 5-H on phenyl ring), 2.26 (q., 6-H on phenyl ring), 1.98 (d., 2-H on phenyl ring). $J_{5H,6H}=8.3$ c.p.s., $J_{2H,6H}=2.8$ c.p.s., $J_{2H,5H}=0$ c.p.s.

Analysis.—Calcd. for $C_{11}H_9Br_2NOS$ (percent): C, 36.37; H, 2.50; N, 3.86. Found (percent): C, 37.47, 37.59; H, 2.65, 2.15; N, 3.80, 4.16, 3.82.

From the mother liquor, the desired 4-bromo-3-p-methoxyphenyl-5-methylisothiazole was obtained. Yield 11.7 g. (79%).

3-p-methoxyphenyl - 5 - methylisothiazole-4-carboxylic acid (VII).—To a stirred solution of 6.5 g. (0.023 mole) of 4-bromo-3-p-methoxyphenyl-5-methylisothiazole in 40 ml. dry ether was added dropwise at −50° C. a solution of n-butyl lithium prepared from 0.54 g. (0.078 mole) of lithium, 5.35 g. (0.039 mole) of n-butyl bromide and 30 ml. dry ether. The Dry Ice-acetone bath was removed and the temperature was allowed to rise to −30° C. The reaction mixture was poured into 50 g. of powdered Dry Ice. When all the Dry Ice was evaporated and the temperature raised to −10° C., 50 ml. of water was added and the mixture was well-shaken in a separatory funnel. The water layer was separated and acidified with dilute hydrochloric acid to give a precipitate of 3-p-methoxyphenyl-5-methylisothiazole-4-carboxylic acid which was crystallized from ethanol-water (1:1). Yield 2.5 g. (43%). M.P. 148–150° C.

$\nu_{C=O}$ 1710 cm.$^{-1}$. $\lambda_{max.}^{EtOH}$ 276.5 m$\mu$ ($\epsilon$ 12,600)

NMR (100 mc.; in $K_2CO_3+D_2O$): $\delta$ (c.p.s. from DOH) +214 (s., 5-$CH_3$), +87 (s., $OCH_3$), −236 (d., 3-H on phenyl ring), −318 (d., 2-H on phenyl ring). $J_{2H,3H}=8.9$ c.p.s.

Analysis.—Calcd. for $C_{12}H_{11}NO_3S$ (percent): C, 57.81; H, 4.45; N, 5.62. Found (percent): C, 57.74, 57.92; H, 4.29, 4.11; N, 5.34, 5.51.

3-p-methoxyphenyl - 5 - methylisothiazole-4-carbonyl chloride (VIII).—A mixture of 3.0 g. (0.012 mole) of 3-p-methoxyphenyl-5-methylisothiazole-4-carboxylic acid and 3 ml. of thionyl chloride was heated at 70° C. for 30 minutes on a water bath. The excess thionyl chloride was distilled off under reduced pressure and the residual oil was distilled in vacuo to give 3-p-methoxyphenyl-5-methylisothiazole-4-carbonyl chloride boiling at 144–148° C./0.4 mm. Yield 2.9 g. (91%) $\nu_{C=O}$ 1765 cm.$^{-1}$.

Sodium 6 - (3-p-methoxyphenyl-5-methylisothiazole-4-carboxamido)penicillanate (IX).—To a stirred solution of 2.6 g. (0.012 mole) of 6-APA and 3 g. (0.036 mole) of sodium bicarbonate in 80 ml. of water and 50 ml. acetone was added dropwise at 5° C. a solution of 2.9 g. (0.011 mole) of 3-p-methoxyphenyl-5-methylisothiazole-4-carbonyl chloride in 30 ml. of dry acetone. The mixture was stirred for 30 minutes at 15° C. and washed with two 100 ml. portions of ether, the washings being discarded. The reaction mixture was chilled to 5° C., layered with 100 ml. ethyl acetate and adjusted to pH 2.0 with dilute hydrochloric acid under vigorous stirring. The organic layer being separated, the aqueous layer was extracted with two 50 ml. portions of ethyl acetate. The combined ethyl acetate extracts were washed with water, dried with anhydrous sodium sulfate. The filtrate was treated with 5 ml. of 35% SEH and concentrated under reduced pressure below 40° C. The separated precipitate of sodium 6-(3-p-methoxyphenyl - 5 - methylisothiazole-4-carboxamido)penicillanate was collected by filtration, washed with ethyl acetate and dried in vacuo over phosphorous pentoxide. Yield 2.6 g. (52%). M.P. 260–165° C.

$\nu_{max.}^{KBr}$ 1780, 1655, 1610, 1400 cm.$^{-1}$. $\lambda_{max.}^{H_2O}$ 278 m$\mu$ ($\epsilon$ 12,900)

Analysis.—Calcd. for $C_{20}H_{20}N_3O_5S_2Na$ (percent): C, 51.16; H, 4.29; N, 8.95. Found (percent): C, 50.90, 50.90; H, 4.70, 4.70; N, 7.91, 8.12.

This penicillin in vitro exhibited Minimum Inhibitory Concentrations of about 0.4 mcg./ml. versus S. aureus Smith and about 0.8 mcg./ml. versus benzylpenicillin-resistant S. aureus Bx–1633–2 and in mice upon intramuscular injection exhibited $CD_{50}$'s of about 30 mgm./kg. versus S. aureus Smith and about 150 mgm./kg. versus S. aureus Bx–1633–2. This penicillin was also very stable in aqueous acid, having a half-life of about 4 hours at pH 2 and 37° C.

EXAMPLE 10

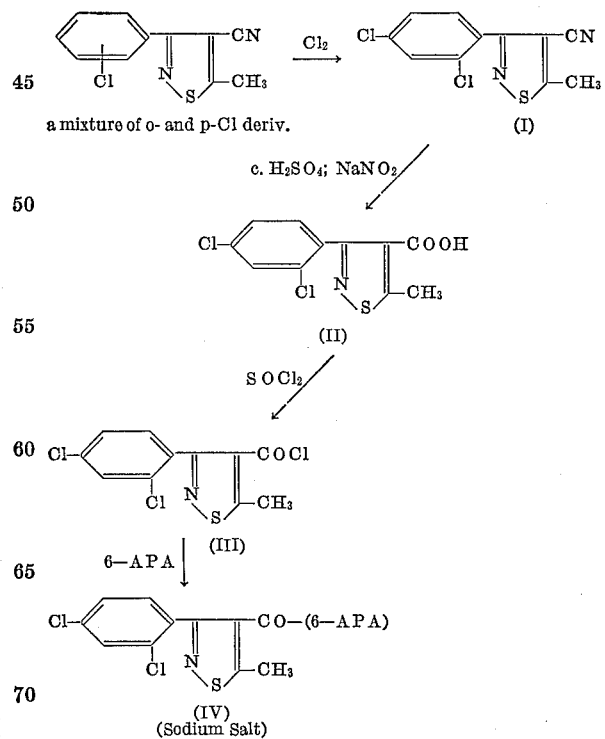

3-(2,4-dichlorophenyl( - 4 - cyano-5-methylisothiazole (I).—In Example 8, 3-o-chlorophenyl-5-cyano-5-methylisothiazole was obtained from a mixture of p-chloro, o- chloro, poly chloro (including 2,4-dichloro) and unchlorinated derivatives. The remaining uncrystallized residue was used as the starting material to obtain the 2,4-dichloro derivative. A mixture of 3 g. of antimony trichloride and 13.9 g. of the uncrystallized residue was heated at 120–130° C. and dry chlorine gas was bubbled into the mixture for 5 hours. The reaction mixture was dissolved in 50 ml. of chloroform and the chloroform solution was washed successively with 20 ml. of 10% hydrochloric acid, 30 ml. of water and 20 ml. of 5% sodium bicarbonate solution. The organic solution was dried with anhydrous sodium sulfate, the solvent being evaporated under reduced pressure. The residue was dissolved in hot ligroin and treated with active carbon. The hot filtrate was allowed to stand at room temperature to separate 2.9 g. of the crude product. Recrystallizations from ligroin gave almost pure 3-(2,4-dichlorophenyl)-4-cyano-5-methylisothiazole as measured by GLC (SE–30, 230° C., He 40 ml./min., retention time 3.9 min.). Yield 2.0 g., M.P. 107–110° C.

$\nu_{max.}^{KBr}$ 2260 cm.$^{-1}$. $\lambda_{max.}^{EtOH}$ 258.5 m$\mu$ ($\epsilon$ 10,400)

NMR 100 mc.; in CCl$_4$ ref. TMS): $\tau$ (p.p.m.) 7.19 (s., 5-CH$_3$), 2.57 (s., phenyl ring protons).

Analysis.—Calcd. for C$_{11}$H$_6$Cl$_2$N$_2$S (percent): C, 49.08; H, 2.25; N, 10.41. Found (percent): C, 49.29, 48.79; H, 2.02, 1.98; N, 9.99, 9.99.

3 - (2,4 - dichlorophenyl) - 5 - methylisothiazole-4-carboxylic acid (II).—A mixture of 1.66 g. (0.006 mole) of 3 - (2,4 - dichlorophenyl) - 4 - cyano-5-methylisothiazole and 30 ml. of conc. sulfuric acid was heated on a water bath at 80° C. for 4 hours. The reaction mixture was cooled and a solution of 0.72 g. (0.104 mole) of sodium nitrite in 3 ml. of water was added with stirring at 0–5° C. After the addition was completed the mixture was stirred at room temperature for 0.5 hour, then at 70° C. for 0.5 hour and poured onto 100 g. of crushed ice. The separated product was filtered, washed with water and dissolved in 50 ml. of 2% aq. sodium bicarbonate solution, a small amount of insoluble material being removed by filtration. The filtrate was acidified with 10% hydrochloric acid to afford the product, 3 - 2,4 - dichlorophenyl-5-methylisothiazole-4-carboxylic acid, which was recrystallized from water-ethanol (1:2). Yield 1.36 g. (76%), M.P. 178–179° C.

$\nu_{max.}^{Nujol}$ 1670 cm.$^{-1}$. $\lambda_{max.}^{EtOH}$ 255 m$\mu$ ($\epsilon$ 8,800)

Analysis.—Calcd. for C$_{11}$H$_7$Cl$_2$NO$_2$S (percent): C, 45.85; H, 2.45; N, 4.86. Found (percent): C, 45.52, 45.40; H, 2.55, 2.57; N, 4.91, 4.80.

3 - (2,4-dichlorophenyl)-5-methylisothiazole-4-carbonyl chloride (III).—A mixture of 1.1 g. (0.0038 mole) of 3-(2,4 - dichlorophenyl) - 5-methylisothiazole-4-carboxylic acid and 3 ml. of thionyl chloride was heated on a water bath at 80° C. for 0.5 hour. The excess thionyl chloride was distilled off under reduced pressure. The residual oil was dissolved in 10 ml. of dry benzene and treated with active carbon. The filtrate was evaporated under reduced pressure to give a viscous oil. The product, 3-(2,4-dichlorophenyl) - 5-methylisothiazole-4-carbonyl chloride, was used for the next reaction without further purification. Yield 1.1 g. (94%).

$\nu_{max.}^{Liq.}$ 1760 cm.$^{-1}$

Sodium 6-[3-(2,4-dichlorophenyl)-5-methylisothiazole-4-carboxamido]penicillanate (IV).—To a stirred solution of 0.86 g. (0.004 mole) of 6-aminopenicillanic acid, 1.0 g. (0.012 mole) of sodium bicarbonate, 40 ml. of water and 25 ml. of acetone was added dropwise a solution of 1.1 g. (0.0036 mole) of 3-(2,4-dichlorophenyl)-5-methylisothiazole-4-carbonyl chloride in 15 ml. of dry acetone at 5° C. The reaction mixture was stirred for 1 hour at 5° C., washed with two 100 ml. portions of ether, covered with 100 ml. of ethyl acetate and adjusted to pH 2.0 with 10% hydrochloric acid at 5° C. The ethyl acetate layer was separated and the aqueous layer was extracted with two 40 ml. portions of ethyl acetate. The combined ethyl acetate extracts were washed with two 20 ml. portions of water and dried with anhydrous sodium sulfate. The filtrate was evaporated to 50 ml. below 40° C. under reduced pressure The concentrate was treated with 1.7 ml. of 35% SEH solution and then 100 ml. of n-hexane to give the product, sodium 6-[3-(2,4-dichlorophenyl)-5-methylisothiazole-4-carboxamido]penicillanate, which was collected by filtration and dried in vacuo over phosphorous pentoxide. Yield 1.64 g. (89%), M.P. 170–175° C. (dec.).

$\nu_{max.}^{KBr}$ 1765, 1640, 1600, 1400 cm.$^{-1}$. $\lambda_{max.}^{H_2O}$ 258 m$\mu$ ($\epsilon$ 9,400)

Analysis.—Calcd. for C$_{19}$H$_{16}$Cl$_2$N$_3$O$_4$S$_2$Na (percent): C, 44.89; H, 3.17; N, 8.27. Found (percent): 46.14, 46.28; H, 4.06, 4.14; N, 7.23, 7.02.

This product in vitro exhibited Minimum Inhibitory Concentrations of about 0.4 mcg./ml. versus S aureus Smith and about 0.8 mcg./ml. versus benzylpenicillin-resistant S. aureus Bx–1633–2 and in mice upon intramuscular injection exhibited CD$_{50}$'s of about 12 mgm./kg. versus S. aureus Smith and about 50 mgm./kg. versus S. aureus Bx–1633–2. This penicillin was also very stable in aqueous acid, having a half-life of about 4.2 hours at pH 2 and 37° C.

EXAMPLE 11

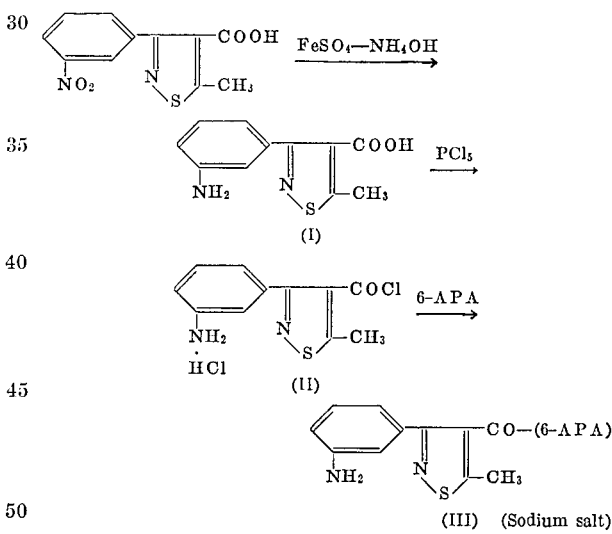

3 - (m-aminophenyl)-5-methylisothiazole-4-carboxylic acid (I).—To a stirred solution of 1 g. (0.0038 mole) of 5-methyl-3-(m-nitrophenyl)isothiazole - 4-carboxylic acid (see Example 7) in 20 ml. of 28% ammonium hydroxide solution was added portionwise 10 g. (0.036 mole) of ferrous sulfate heptahydrate at 60–70° C. The reaction mixture was stirred at 70° C. for one hour, filtered with a Dicalite-precoated filter and the filter cake was washed with three 10 ml. portions of hot water. The combined filtrate and washings were evaporated to remove the excess ammonia. The concentrate was adjusted to pH 3.0 with 10% hydrochloric acid to give the product, 3-(m-aminophenyl)-5-methylisothiazole-4 - carboxylic acid, which was recrystallized from methanol. Yield 0.74 g. (83%). M.P. 312° C.

$\nu_{max.}^{Nujol}$ 1580–1520 (broad), 1400 cm.$^{-1}$. $\lambda_{max.}^{1\%}$ aq. NaHCO$_3$ 271 m$\mu$ ($\epsilon$ 11,400)

Analysis.—Calcd. for C$_{11}$H$_{10}$N$_2$O$_2$S (percent): C, 56.39; H, 4.30; N, 11.96. Found (percent): C, 56.91, 56.88; H, 4.57, 4.13; N, 11.91, 11.92.

3 - (m - aminophenyl) - 5 - methylisothiazole - 4 - carbonyl chloride hydrochloride (II).—A mixture of 1.92 g. (0.082 mole) of 3-(m-aminophenyl)-5-methylisothiazole- 4-carboxylic acid, 2.6 g. (0.0125 mole) of phosphorous pentachloride and 20 ml. of dry benzene was heated at 50° C. for 20 minutes to make a solution. The solvent was distilled off under reduced pressure to give the oil, which was dissolved in 5 ml. of toluene and evaporated again under reduced pressure to remove phosphorous oxychloride. The operation was repeated several times and then treated with active carbon to give a semisolid product. The product, 3-(m-aminophenyl)-5-methylisothiazole-4-carbonyl chloride hydrochloride, was used for the next reaction without further purification. Yield 2.2 g. (93%).

$\nu_{max}^{Liq.}$ 1760 cm.$^{-1}$

Sodium 6 - [3-(m-aminophenyl)-5-methylisothiazole-4-carboxamido]penicillanate (III).—To a stirred solution of 1.8 g. (0.0083 mole) of 6-APA, 2.8 g., 0.033 mole) of sodium bicarbonate, 50 ml. of water and 30 ml. of acetone was added dropwise 2.2 g. (0.0076 mole) of 3-(m-aminophenyl)-5-methyl-4-carbonyl chloride in 20 ml. of dry acetone at 5° C. The reaction mixture was stirred for 15 minutes at 15° C., washed with two 100 ml. portions of ether and adjusted to pH 4.0 with 10% hydrochloric acid to separate yellowish brown colored precipitate, which contained free 6-[(3-m-aminophenyl)-5-methylisothiazole-4-carboxamido]penicillanic acid ($\nu_{max}$ 1780, 1720 (sh.), 1650, 1520 cm.$^{-1}$). The precipitate was removed by filtration. The filtrate was layered with 100 ml. of ethyl acetate and adjusted to pH 2.0 with 10% hydrochloric acid. The ethyl acetate layer was separated and the aqueous layer was extracted with two 50 ml. portions of ethyl acetate. The combined ethyl acetate extracts were washed with two 50 ml. portions of water, dried with anhydrous sodium sulfate and concentrated to 100 ml. under reduced pressure below 40° C. The concentrate was treated with 4 ml. of 35% SEH solution to give the product, sodium 6-[3 - (m-aminophenyl) - 5-methyl-isothiazole - 4 - carboxamido]penicillanate, which was collected by filtration, washed with ethyl acetate and dried in vacuo over phosphorous pentoxide. Yield 1.38 g. (40%). M.P. 25–30° C. (dec.).

$\nu_{max}^{KBr}$ 1760, 1655, 1600, 1400 cm.$^{-1}$. $\lambda_{max}^{H_2O}$ 250 m$\mu$ ($\epsilon$ 10,500)

Analysis.—Calcd. for $C_{19}H_{19}N_4O_4S_2Na \cdot 5H_2O$ (percent): C, 41.95; H, 5.37; N, 10.30. Found (percent): C, 41.34, 41.10; H, 4.65, 4.65; N, 8.89, 8.99.

This product in vitro exhibited Minimum Inhibitory Concentrations of about 1.6–3.1 mcg./ml. versus S. aureus Smith and about 6.3 mcg./ml. versus benzylpenicillin-resistant S. aureus Bx–1633-2 and in mice upon intramuscular injection exhibited CD$_{50}$'s of about 35 mgm./kg. versus S. aureus Smith and about 140 mgm./kg. versus S. aureus Bx–1633-2. This penicillin was also very stable in aqueous acid, having a half-life of greater than 5 hours at pH 2 and 37° C.

EXAMPLE 12

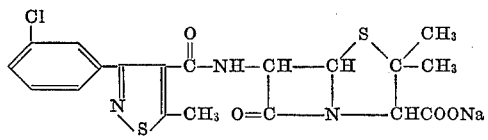

Sodium 6 - (3 - m - chlorophenyl - 5 - methylisothiazole-4-carboxamido)penicillanate.—In similar fashion there was prepared 3 - m - chlorophenyl - 5 - methylisothiazole-4-carboxylic acid (M.P. 147–148° C.) which was converted to its acid chloride (B.P. 137–139° C./0.6 mm.) which was reacted with 6-aminopenicillanic acid to produce, sodium 6 - (3 - m - chlorophenyl - 5 - methylisothiazole-4-carboxamido)penicillanate, melting at 213–218° C. with decomposition.

Analysis. — Calcd. for $C_{19}H_{17}ClN_3O_4S_2Na \cdot 1\frac{1}{2}H_2O$ (percent): C, 45.55; H, 4.25; N, 8.39. Found (percent): C, 45.37, 45.47; H, 4.33, 4.22; N, 8.46, 8.66.

This product in vitro exhibited Minimum Inhibitory Concentrations of about 0.2–0.4 mcg./ml. vs. S. aureus Smith and about 0.8 mcg./ml. vs. benzylpenicillin-resistant S. aureus Bx–1633-2 and was very stable in aqueous acid having a half-life of about 4.9 hours at pH 2 and 37° C.

EXAMPLE 13

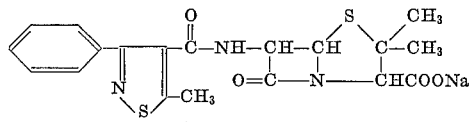

3-imino-3-phenylpropionitrile.—The preparation of 3-imino-3-phenylpropionitrile generally followed the procedure of Holzwart, J. Prakt. Chem. [2], 39, 242.

50% sodium dispersion in paraffin oil (72.5 g.) was suspended in a mixture of 300 ml. of benzene and 250 ml. of toluene. A mixture of benzonitrile (81.5 g.) and acetonitrile (64.5 g.) was added to the suspension with cautious heating, whereupon a gentle reflux commenced that was maintained by the addition rate of the nitriles. When the addition was complete, the reaction was refluxed for 18 hours.

The mixture was cooled to 5° C. and filtered. The gummy solids were slurried in 1.5 l. of pentane and filtered to remove the paraffin oil. The solids were stirred with one liter of water for one hour, the solids removed by filtration and sucked dry on the filter. The solid was recrystallized twice from benzene-petroleum solvent [B.P. 60–68° C. comprising essentially n-hexane ("Skellysolve B")] to yield 48.0 g. (42%) M.P. 79–80°, of the desired product.

N - thioacetylpiperidine. — Phosphorous pentasulfide (36.5 g.) was suspended in 45 ml. of pyridine. N-acetylpiperidine (42.3 g.) in 45 ml. of pyridine was added to the suspension with cooling. The yellow suspension was heated and allowed to reflux for 2 hours.

After refluxing, the black mixture was concentrated in vacuo to near drynes and the resulting residue was treated with 150 ml. 3 N HCl. The resultant black liquid and tar was extracted twice with ether. The dark red ether solution was washed with water, then brine and dried over $Na_2SO_4$. Evaporation of the ether following filtration, left 23.5 g. (48%) of a red crystalline solid, M.P. 50–52° C.

S - carboxymethyl-1-thioethylpiperididium bromide.— N-thioacetylpiperidine (23.57 g.) was dissolved in 150 ml. of dry benzene. Bromoacetic acid (25.2 g.) dissolved in 44 ml. benzene was added and the resultant mixture was allowed to stir at room temperature for 22 hours. A precipitate formed several minutes after the addition of the bromoacetic acid.

The reaction mixture was diluted with 550 ml. of dry ether and filtered. A pale pink solid was collected, triturated with dry ether, filtered and dried in vacuo over $P_2O_5$ to yield 43.3 g. of pale pink crystals, M.P. 159–160°.

S-carboxymethyldithioacetate.—S - carboxymethyl - 1-thioethylpiperididium bromide (20.0 g.) was mixed with absolute ethanol (90 ml.), cooled to 0° C. and hydrogen sulfide was bubbled into the suspension. The suspension became a dark red solution in about an hour. After bubbling $H_2S$ into the solution for a total of four hours, the solution was stored at 4° C. for 17½ hours.

The red solution, containing some yellow precipitate, was concentrated in vacuo to near dryness and the residue was extracted several times with ether. The ether solution was dried over $Na_2SO_4$, filtered and taken to dryness in vacuo. The red oil crystallized to yield 11.60 g. of red crystals.

The crystals were extracted with boiling "Skellysolve B," which yielded 7.68 g. (72%) of crystals upon cooling, M.P. 79–81° C. Jensen and Pedersen, Acta. Chem. Scand., 15, 1087 (1961).

4-cyano-5-methyl-3-phenylisothiazole.—A mixture of 3-imino-3-phenylpropionitrile (5.00 g., 0.0347 mole) and S-carboxymethyldithioacetate (5.20 g., 0.347 mole) was stirred at 105–109° under 0.3 mm. pressure for 28 minutes. Mercaptoacetic acid distilled from the reaction mixture. After cooling under nitrogen, the residual melt was dissolved in benzene (60 ml.). Potassium carbonate (7.20 g. (0.052 mole) was added, and then a solution of iodine (13.20 g., 0.052 mole) in benzene (160 ml.) was added.

After stirring at 28° for 15 hrs., the supernatant solution was washed in succession with aqueous sodium thiosulfate solution, aqeuous sodium hydroxide solution and water. Drying and subsequent removal of the solvent left crystalline solid (2.36 g., 34%). Recrystallization ("Skellysolve B") gave material having a melting point of 76–78°.

5-methyl-3-phenylisothiazole-4-carbonyl chloride.—A mixture of 5-methyl-3-phenyl-4-isothiazolecarbonitrile (1.45 g.), ethylene glycol (8.9 ml.), water (1.8 ml.) and potassium hydroxide (0.885 g.) was heated under reflux for 48.5 hrs.

The mixture was poured onto ice (30 g.). Acidification with hydrochloric acid (6 N) gave crystalline solid which was washed with water and dried; yield, 1.45 g. (91%), M.P. 148–151°. Recrystallization (benzene/"Skellysolve B") gave 1.19 g., M.P. 151–153°.

5-methyl-3-phenylisothiazole-4-carbonyl chloride — A mixture of 3.2 g. (0.0147 mole) 5-methyl-3-phenylisothiazole-4-carboxylic acid and 5 ml. thionyl chloride was warmed on a water bath at 70–80° C. for one hour. The excess thionyl chloride was removed by distilaltion under reduced pressure to give an oil which was distilled in vacuo. Yield 3.2 g. (95%) of 5-methyl-3-phenylisothiazole-4-carbonyl chloride, B.P. 122–125° C./0.6 mm.

$\nu_{max.}^{liquid}$ 1770, 1490, 1450, 1400, 1360, 1230, 1105 cm.$^{-1}$

Sodium 6 - (5 - methyl-3-phenylisothiazole-4-carboxamido)-penicillanate.—The acid chloride was converted into the penicillin by the procedure of Example 1.

EXAMPLE 14

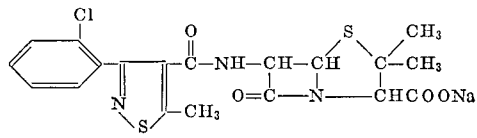

3-imino-3-(2'-chlorophenyl)-propionitrile. — 50% sodium dispersion in paraffin oil (36 g.) was suspended in a solution of 146 ml. of benzene and 120 ml. of toluene.

A solution of acetonitrile (34 g.), o-chlorobenzonitrile (52 g.) and benzene (25 ml.) was cautiously added to the sodium suspension. The reaction was started with the aid of heat and then maintained at reflux temperatures by the rate of addition of the nitriles. When the addition was complete, the reaction mixture was refluxed for 6 hours.

The brown suspension was cooled to 5° C. and filtered, The resultant filter cake was resuspended in benzene, filtered and washed thoroughly to remove any residual paraffin oils.

The solids were slurried with an excess of $NH_4Cl$ solution for 30 minutes then collected by filtration to yield 53.7 g. (79.5%), M.P. 90–95°.

The solids were dissolved in ethanol, partially decolorized with charcoal ("Darko KB") and recrystallized from ethanol-water to yield 24 g. (35.5%), of light orange crystals, M.P. 101–104° C. Von Meyer, J. Prakt. Chem. [2] 92, 174.

3 - (2 - chlorophenyl)-5-methyl-4-isothiazolecarbonitrile.—A mixture of 3-(2-chlorophenyl)-3-iminopropionitrile (5.00 g., 0.028 mole) and S-carboxymethyldithioacetate (4.20 g., 0.028 mole) was heated at 116–125° under 7 mm. pressure for 36 minutes. After cooling under nitrogen, the residue was dissolved in benzene (100 ml.). Potassium carbonate (5.8 g., 0.042 mole) was added and then a solution of iodine (10.70 g., 0.042 mole) in benzene (120 ml.) was added.

After stirring at 28° for 16 hrs., the mixture was worked-up as previously described to yield a mixture (3.1 g.) of the desired nitrile and the starting iminonitrile. The mixture was separated by chromatography on alumina to yield the nitrile (1.32 g., 20%); recrystallization (ethanol) gave M.P. 86–87°.

Analysis.—Calcd. for $C_{11}H_7ClN_2S$ (percent): C, 56.28; H, 3.00; Cl, 15.11; N, 11.94; S, 13.63. Found (percent): C, 56.10; H, 3.11.

3 - (2 - chlorophenyl)-5-methyl-4-isothiazolecarboxylic acid.—3 - (2-chlorophenyl)-5-methyl-4-isothiazolecarbonitrile (1.02 g.) was hydrolyzed by the procedure previously described in Example 13; yield of the acid was 1.04 g. (94%).

Recrystallization (benzene/"Skellysolve B") gave material with a M.P. 185.5–186.5°.

3-o-chlorophenyl-5-methylisothiazole-4-carbonyl chloride.—A mixture of 2.7 g. (0.0107 mole) of 3-o-chlorophenyl-5-methylisothiazole-4-carboxylic acid and 3 ml. of thionyl chloride was heated on a water bath at 80° C. for 30 minutes. The excess thionyl chloride was removed by distillation under reduced pressure and the residue was distilled in vacuum. Yield 2.55 g. (88%) of 3-o-chlorophenyl-5-methylisothiazole-4-carbonyl chloride, B.P. 130–135° C./3 mm.

$\nu_{max.}^{Liquid}$ 1760 cm.$^{-1}$

Sodium 6-(3-o-chlorophenyl-5-methylisothiazole-4-carboxamido)penicillanate.—This penicillin was prepared from the acid chloride by the procedure of Example 8.

EXAMPLE 15

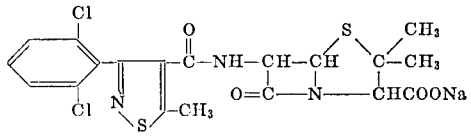

3 - (2,6 - dichlorophenyl) - 5-methyl-4-isothiazole-carbonitrile.—A mixture of 3-(2,6-dichlorophenyl)-3-iminopropionitrile (10.14 g., 0.0476 mole; prepared from 2,6-dichlorobenzonitrile by the procedure of Examples 13 and 14) and S-carboxymethyldithioacetate (7.50 g., 0.050 mole) was heated at 145–162° under 7 mm. pressure for 20 minutes. Mercaptoacetic acid distilled from the mixture. After cooling under nitrogen the residue was dissolved in benzene (180 ml.) Potassium carbonate (10.32 g., 0.075 mole) was added, and then a solution of iodine (18.90 g., 0.075 mole) in benzene (230 ml.). was added.

After stirring at 28° for 15 hours, the supernatant solution was washed in succession with aqueous sodium thiosulfate, aqueous sodium hydroxide and water. Drying and subsequent removal of the solvent left 3.48 g. of a mixture of the starting iminonitrile and isothiazole. The material was chromatographed on alumina (elution with benzene/ "Skellysolve B") to yield 0.85 g. (7%) of pure isothiazole nitrile. Recrystallization (ethanol) gave material with M.P. 125–126°;

$\lambda_{max.}^{EtOH}$ 255 ($\epsilon$ 8,200)

Analysis.—Calcd. for $C_{11}H_6Cl_2N_2S$ (percent): C, 49.09; H, 2.25; Cl, 26.35; N, 10.41; S, 11.91. Found (percent): C, 49.06; H, 2.31; Cl, 25.99; N, 10.31; S, 12.00.

3 - (2,6 - dichlorophenyl) - 5-methyl-4-isothiazolecarboxylic acid.—A mixture of 3-(2,6-dichlorophenyl)-5-methyl-4-isothiazole carbonitrile (729.5 mg.), ethylene glycol (3.3 ml.), water (0.66 ml.) and potassium hydroxide (0.33 g.) was heated under reflux for 49 hours.

The mixture was poured onto ice (11 g.) Acidification with hydrochloric acid (6 N) gave crystalline solid which was washed with water and dried; yield: 670.0 mg. (86%), M.P. 210–212°. Recrystallization (benzene/"Skellysolve B") gave 550 mg., M.P. 213.5–215°.

$\lambda_{max.}^{EtOH}$ 253 ($\epsilon$ 7,550)

Analysis.—Calcd. for $C_{11}H_7Cl_2NO_2S$ (percent): C, 45.85; H, 2.45; Cl, 24.61; N, 4.86; S, 11.13. Found (percent): C, 46.10; H, 2.57; Cl, 24.56; N, 4.76.

Sodium 6-[3-(2,6-dichlorophenyl)-5-methyl-4-isothiazolecarboxamido]-penicillanate hydrate.—To 577 mg. (0.002 mole) of 3-(2,6-dichlorophenyl)-5-methyl-4-isothiazolecarboxylic acid was added 5 ml. of thionyl chloride and the resulting solution refluxed gently for one and a half hours. The excess $SOCl_2$ was removed in vacuo at 25° C. leaving a crystalline residue which was immediately dissolved in 5 ml. of acetone and added all at one to a previously prepared, stirred and cooled solution (5° C.) of 500 mg. 6-APA, 500 mg. of $NaHCO_3$, 10 ml. of water and 5 ml. of acetone. Stirring at 5° to 10° C. was continued for 10 minutes and then for 30 minutes with the ice bath removed. The acetone was then removed at 20° C. under reduced pressure and 20 ml. $H_2O$ added to the concentrate. This aqueous solution was extracted once with 50 ml. of ether and the ether discarded. The aqueous solution was then layered with 40 ml. of ethyl acetate and stirred and cooled while being acidified to pH 2 with excess 40% $H_3PO_4$. The ethyl acetate layer was washed with three 25 ml. portions of water and two 25 ml. portions of saturated NaCl solution. Next, the organic layer was dried 10 minutes over $Na_2SO_4$, filtered, and treated with 0.740 ml. (0.002 mole) of NaEH (a solution of sodium 2-ethylhexanoate in n-butanol whose concentration is 37 ml.=0.1 mole). The ethyl acetate solution was concentrated at 20° C. under reduced pressure to an oil and the oil redissolved in 25 ml. methyl isobutyl ketone. Two drops of water were added and the sides of the flask scratched. After one hour there was collected 840 mg. of MIBK washed, acetone washed, petroleum ether washed and air dried sodium 6-[3-(2,6-dichlorophenyl)-5-methyl-4-isothiazolecarboxamido]-penicillanate hydrate. It decomposed slowly above 182° C. and its infrared and NMR spectra were entirely consistent with the desired structure, indicating a high degree of purity.

*Analysis.*—Calcd. for $C_{19}H_{16}Cl_2N_3O_4S_2 \cdot Na$ and corrected for water of crystallization (Karl Fischer) (percent): C, 44.88; H, 3.18; N, 8.27. Found (percent): C, 45.20; H, 3.55; N, 7.92, Karl Fischer=2.86% $H_2O$.

EXAMPLE 16

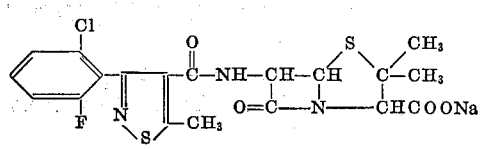

3-(2-chloro - 6 - fluorophenyl)-5-methyl-4-isoxazolecarboxylic acid.—To a stirred and cooled slurry of 52 g. (0.3 mole) of 2-chloro-6-fluorobenzaldoxime [C.A. 31: 3816; Ber. 69B, 2253-8 (1936)] in 300 ml. of chloroform at —10° C. was added 24 g. (0.33 mole) of chlorine in 300 ml. of chloroform over a twenty minute period. The cooling bath was then removed and stirring continued for 2.5 hours. The $CHCl_3$ was then removed at 20° C. under reduced pressure and the residual oil dissolved in 100 ml. of methanol and added over a one minute period to a —30° C. stirred solution of 300 ml. methanol, 16.2 g. (0.3 mole) of sodium methoxide and 39 g. (0.3 mole) of ethyl acetoacetate. The exothermic reaction was controlled with a Dry Ice-acetone bath to keep the temperature below —10° C. After 30 minutes at 0° C. to —5° C. the bath was removed and stirring continued for 12 hours at room temperature (22° C.). The methanol was then removed in vacuo at 22° C. and the oily residue shaken with 300 ml. ether and 300 ml. of water. The ether layer was washed with three 100 ml. portions of water and then evaporated to an oil. The oil was then saponified at reflux for 2 hours in a solution of 300 ml. methanol, 100 ml. $H_2O$ and 24 g. of sodium hydroxide The methanolic solution was then concentrated to remove the methanol and 300 ml. of water added. The aqueous solution was extracted with two 300 ml. portions of ether and then placed on the rotary flash evaporator to remove dissolved ether. The solution was then cooled and stirred while being acidified to pH 2 with 40% phosphoric acid. The crystalline product was then filtered off, washed several times with water and air dried. One crystallization from ethanol-water gave 52 g.; M.P. 205-206° C.

IR and NMR spectra were consistent wtih the desired structure.

*Analysis.*—Calcd. for $C_{11}H_7ClFNO_3$ (percent): C, 51.8; H, 2.76; N, 5.49 (lot #5605-36). Found (percent): C, 51.9; H, 2.75; N, 5.67.

Methyl 3-(2-chloro - 6 - fluorophenyl)-5-methyl-4-isoxazolecarboxylate.—To 51 g. (0.2 mole) of 3-(2-chloro-6-fluorophenyl)-5-methyl - 4 - isoxazolecarboxylic acid was added 100 ml. of thionyl chloride and the mixture heated at gentle reflux for four hours. The excess $SOCl_2$ was removed at 25° C. under reduced pressure and the crude acid chloride dissolved in 300 ml. of methanol. This solution was refluxed for three hours and then concentrated to an oil under reduced pressure. The residue was crystallized in "Skellysolve B" (petroleum ether) and recrystallized from cyclohexane to give 37 g., M.P. 55–56° C.

The IR and NMR spectra were entirely consistent with the desired structure.

*Analysis.*—Calcd. for $C_{12}H_9ClFNO_3$ (percent): C, 53.33; H, 3.34; N, 5.19. Found (percent): C, 53.69; H, 3.45; N, 4.96.

1 - amino-1-(2-chloro - 6 - fluorophenyl)-2-carbomethoxy-1-buten-3-one.—To 27 g. (0.1 mole) of methyl 3-(2-chloro-6-fluorophenyl)-5-methyl - 4 - isoxazolecarboxylate in 150 ml. of methanol was added approximately 5 g. of commercial Raney nickel catalyst and the mixture hydrogenated at an initial pressure of 50 p.s.i. for 5.5 hours, at which time the Parr apparatus showed an uptake of 9 lbs. (0.1 mole) of $H_2$. The catalyst was then filtered off, washed with methanol and the combined filtrates concentrated to an oil under reduced pressure at 20° C. The oil slowly crystallized but a suitable recrystallization solvent was not found due to its very low melting point. The product was used "as is" for the next step.

3-(2-chloro-6-fluorophenyl)-5-methyl-4 - isothiazolecarboxylic acid.—A mixture of 27.1 g. (0.1 mole) of 1-amino - 1 - (2 - chloro-6-fluorophenyl)-2-carbomethoxy-1-buten-3-one, 66.6 g. (0.3 mole) of $P_2S_5$, 24.6 g. (0.1 mole) of chloranil in 600 ml. of toluene was stirred at reflux for 20 minutes. The mixture was filtered and the filtrate evaporated under reduced pressure at 20° C. to an oil. To this oil was added 900 ml. of benzene and the solution filtered to remove a small amount of solids. The solution was concentrated under reduced pressure at 20° C. to a volume of about 100 ml. This solution was placed on a 26½ x 7½ cm. column of Merck alumina and eluted with 3.5 liters of benzene. Concentration of the eluate under reduced pressure left an oil which was saponified at reflux in 150 ml. methanol, 50 ml. water and 4 g. of sodium hydroxide. The methanol was removed in vacuo and 180 ml. water added. Two 200 ml. ether extracts were taken and discarded. The aqueous phase was cooled and acidified to pH 2 with 40% $H_3PO_4$. The resulting crystalline precipitate was filtered off, washed with three 100 ml. portions of water and air dried. Recrystallization from ethanol-water (1:1 by volume) gave 14.5 g., M.P. 199–201° C. (53.7% of theory).

IR and NMR spectra were entirely consistent with the desired structure.

*Analysis.*—Calc'd for $C_{11}H_7ClFNO_2S$ (percent): C, pH 2 with 40% $H_3PO_4$. The MIBK extract was washed H, 2.89, 2.71; S, 11.80, 11.88.

Sodium 6-[3-(2-chloro-6-fluorophenyl)-5-methyl-4-isothiazolecarboxamido]-penicillanate monohydrate.—To 6.8 g. (0.025 mole) of 3-(2-chloro-6-fluorophenyl)-5-methyl-4-isothiazolecarboxylic acid was added 30 ml. of thionyl chloride and the mixture heated at reflux for 1.5 hours on the steam bath. The excess $SOCl_2$ was then removed at 20°

C. under reduced pressure. The remaining oil was dissolved in 50 ml. of acetone and added, all at once, to a vigorously stirred solution of 5.4 g. (0.025 mole) of 6-APA, 8.4 g. (0.1 mole) of NaHCO₃ in 100 ml. of water and 50 ml. of acetone at 5° C. After 10 minutes the ice bath was removed and stirring was continued for one and one-half hours. The acetone was then removed under reduced pressure at 20° C. Fifty ml. of water was added and the solution extracted with two 100 ml. portions of ether and the ether extracts discarded. The aqueous phase was then layered with 75 ml. of methyl isobutyl ketone (MIBK) and stirred and cooled while being acidified to PH 2 with 40% H₃PO₄. The MIBK extract was washed two times with 50 ml. portions of water and two times with 75 ml. portions of saturated Na₂SO₄ solution. The MIBK solution was then filtered through anhydrous Na₂SO₄ and the Na₂SO₄ cake washed with 50 ml. of MIBK and the filtrates combined. The MIBK solution was then treated with 8 ml. of sodium 2-ethylhexanoate in n-butanol (concentration of 34 ml.=0.1 mole). Scratching induced crystallization and 30 minutes later the product was filtered off, washed with three 100 ml. portions of acetone and air dried. After drying 24 hours under vacuum over P₂O₅ there was 8.5 g. of snow white crystals with a decomposition point of 175–176° C.

The IR and NMR spectra were entirely consistent with the desired structure.

*Analysis.*—Calc'd for $C_{19}H_{16}ClFN_3O_4S_2Na$ (percent): C, 46.34; H, 3.27; N, 8.54. Found (percent): C, 46.25; H, 3.44; N, 8.20. (Corrected for 2.67% H₂O determined by the Karl Fischer method.)

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. A compound having the formula

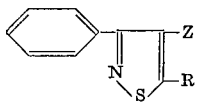

wherein R is (lower)alkyl and Z represents

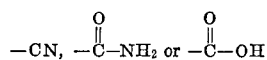

2. A compound having the formula

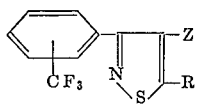

wherein R represents (lower)alkyl and Z represents

3. A compound having the formula

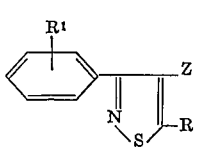

wherein R represents (lower)alkyl, R¹ represents (lower)alkoxyl, and Z represents

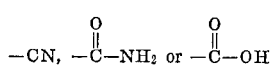

4. A compound having the formula

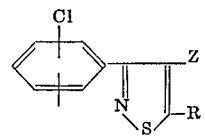

wherein R represents (lower)alkyl and Z represents

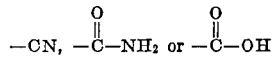

5. A compound having the formula

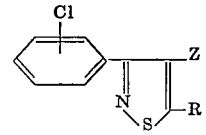

wherein R represents (lower)alkyl and Z represents

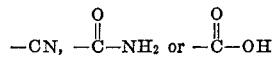

6. A compound having the formula

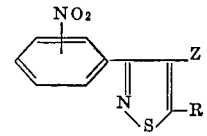

wherein R represents (lower)alkyl and Z represents

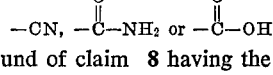

7. A compound of claim 8 having the formula

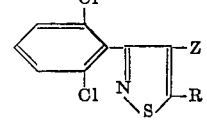

wherein R represents (lower)alkyl and Z represents

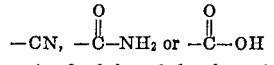

8. A compound of claim 4 having the formula

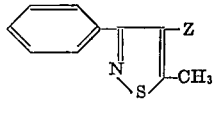

wherein Z represents

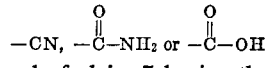

9. A compound of claim 7 having the formula

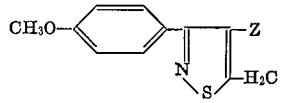

wherein Z represents

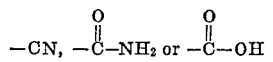

10. A compound of claim 8 having the formula

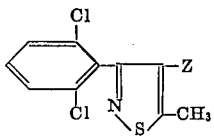

wherein Z represents

11. A compound of claim 9 having the formula

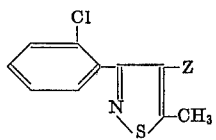

wherein Z represents

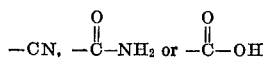

12. A compound of claim 8 having the formula

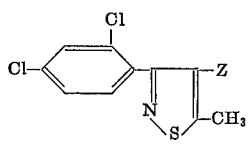

wherein Z represents

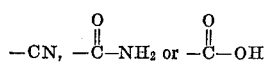

13. A compound having the formula

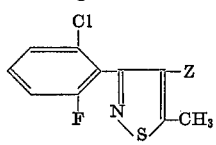

wherein Z represents

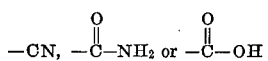

14. A compound having the formula

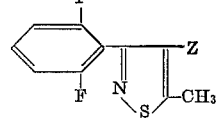

wherein Z represents

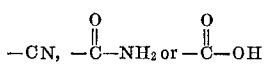

References Cited

UNITED STATES PATENTS 3,311,611  3/1967  Lemieux et al. _____ 260—302
3,341,518  12/1967  Naito et al. _____ 260—302

OTHER REFERENCES

Grant et al.: J. Chem. Soc. (London), 1965, June, pp. 3842–5.

ALEX MAZEL, Primary Examiner

R. J. CALLAGHER, Assistant Examiner